US007004161B2

(12) United States Patent
Kolb

(10) Patent No.: US 7,004,161 B2
(45) Date of Patent: Feb. 28, 2006

(54) INSERTABLE THERMOTIC MODULE FOR SELF-HEATING CANS

(75) Inventor: Kenneth W. Kolb, Kajang (MY)

(73) Assignee: Expressasia Berhad, Kuala Lampur (MY)

( * ) Notice: Subject to any disclaimer, the term of this patent is extended or adjusted under 35 U.S.C. 154(b) by 0 days.

(21) Appl. No.: 10/245,650

(22) Filed: Sep. 17, 2002

(65) Prior Publication Data

US 2003/0041853 A1 Mar. 6, 2003

Related U.S. Application Data

(63) Continuation-in-part of application No. 10/003,877, filed on Oct. 25, 2001.
(60) Provisional application No. 60/288,184, filed on May 2, 2001.

(51) Int. Cl.
*F24J 1/00* (2006.01)

(52) U.S. Cl. .................. 126/263.09; 126/262; 426/113
(58) Field of Classification Search ............ 126/263.06, 126/263.01, 263.05, 263.07, 263.08, 263.09, 126/261, 262; 426/112, 113, 114; 206/219, 206/222; 62/4
See application file for complete search history.

(56) References Cited

U.S. PATENT DOCUMENTS

| | | | | |
|---|---|---|---|---|
| 2,288,895 A | | 7/1942 | Fink | 220/8 |
| 2,300,793 A | * | 11/1942 | Martin | 126/263.08 |
| 2,327,447 A | | 8/1943 | O'Brien | 220/20 |
| 2,746,265 A | | 5/1956 | Mills | 62/94 |
| 2,850,006 A | | 9/1958 | Karpalo | 126/262 |
| 3,101,707 A | * | 8/1963 | Ryan et al. | 126/263.05 |
| 3,213,932 A | | 10/1965 | Gottfurcht et al. | 165/61 |
| 3,815,867 A | | 6/1974 | Rein et al. | 251/61.3 |
| 3,874,557 A | | 4/1975 | Porter | 222/80 |
| 3,970,068 A | | 7/1976 | Sato | 126/263 |

(Continued)

FOREIGN PATENT DOCUMENTS

| | | | |
|---|---|---|---|
| GB | 2089 970 A | * | 6/1982 |
| WO | WO 93/17928 A | * | 9/1993 |
| WO | WO 96/29255 | | 9/1996 |

*Primary Examiner*—Josiah C. Cocks
(74) *Attorney, Agent, or Firm*—Jones, Walker, Waechte Poitevent, Carrere & Denegre, L.L.P.

(57) ABSTRACT

A self-heating container which comprises a container body having an internal beverage section and a thermic cavity. A liquid reactant is positioned in a first section of the thermic cavity and a solid reactant positioned in a second section of the thermic cavity. The solid reactant includes at least 70% by weight CaO and at least 5% by weight of a carbonate from the group consisting of $MgCO_3$, $CaCO_3$, $SrCO_3$, $BaCO_3$, and $RaCO_3$.

22 Claims, 23 Drawing Sheets

U.S. PATENT DOCUMENTS

| | | | | |
|---|---|---|---|---|
| 4,067,949 A | * | 1/1978 | Karabedian | 264/230 |
| 4,338,098 A | * | 7/1982 | Yamaji | 126/263.05 |
| 4,486,366 A | * | 12/1984 | Reddy | 264/416 |
| 4,501,259 A | | 2/1985 | Apellaniz | 126/263 |
| 4,741,324 A | | 5/1988 | Ina et al. | 126/263 |
| 4,762,113 A | | 8/1988 | Hamasaki | 126/263 |
| 4,784,113 A | | 11/1988 | Nagai et al. | 126/263 |
| 4,784,678 A | | 11/1988 | Rudick et al. | 62/4 |
| 4,793,323 A | | 12/1988 | Guida et al. | 126/263 |
| 4,802,343 A | | 2/1989 | Rudick et al. | 62/294 |
| 4,895,135 A | | 1/1990 | Hamasaki | 126/263 |
| 4,949,702 A | * | 8/1990 | Suzuki et al. | 126/263.01 |
| 5,072,605 A | | 12/1991 | Imazu et al. | 72/46 |
| 5,088,870 A | | 2/1992 | Fukuhara et al. | 413/4 |
| 5,169,524 A | | 12/1992 | Meiritz et al. | 210/232 |
| 5,190,609 A | * | 3/1993 | Lin et al. | 156/85 |
| 5,255,812 A | | 10/1993 | Hsu | 220/277 |
| 5,461,867 A | | 10/1995 | Scudder et al. | 62/4 |
| 5,465,707 A | | 11/1995 | Fulcher et al. | 126/263.08 |
| 5,483,949 A | | 1/1996 | James | 126/263.05 |
| 5,542,418 A | | 8/1996 | James | 126/263.06 |
| 5,555,741 A | | 9/1996 | Oakley | 62/294 |
| 5,626,022 A | | 5/1997 | Scudder et al. | 62/4 |
| 5,809,786 A | | 9/1998 | Scudder et al. | 62/4 |
| 5,943,875 A | | 8/1999 | Hymes | 62/294 |
| 5,946,930 A | | 9/1999 | Anthony | 62/293 |
| 6,103,280 A | | 8/2000 | Molzahn et al. | 426/109 |
| 6,134,894 A | | 10/2000 | Searle et al. | 62/62 |
| 6,167,718 B1 | | 1/2001 | Halimi et al. | 62/293 |
| 6,170,283 B1 | | 1/2001 | Anthony | 62/294 |
| 6,178,753 B1 | | 1/2001 | Scudder et al. | 62/4 |
| 6,266,879 B1 | | 7/2001 | Scudder et al. | 29/890.035 |
| 6,305,175 B1 | | 10/2001 | Searle et al. | |
| 6,502,407 B1 | | 1/2003 | Searle et al. | |
| 6,705,309 B1 | | 3/2004 | Searle et al. | |

* cited by examiner

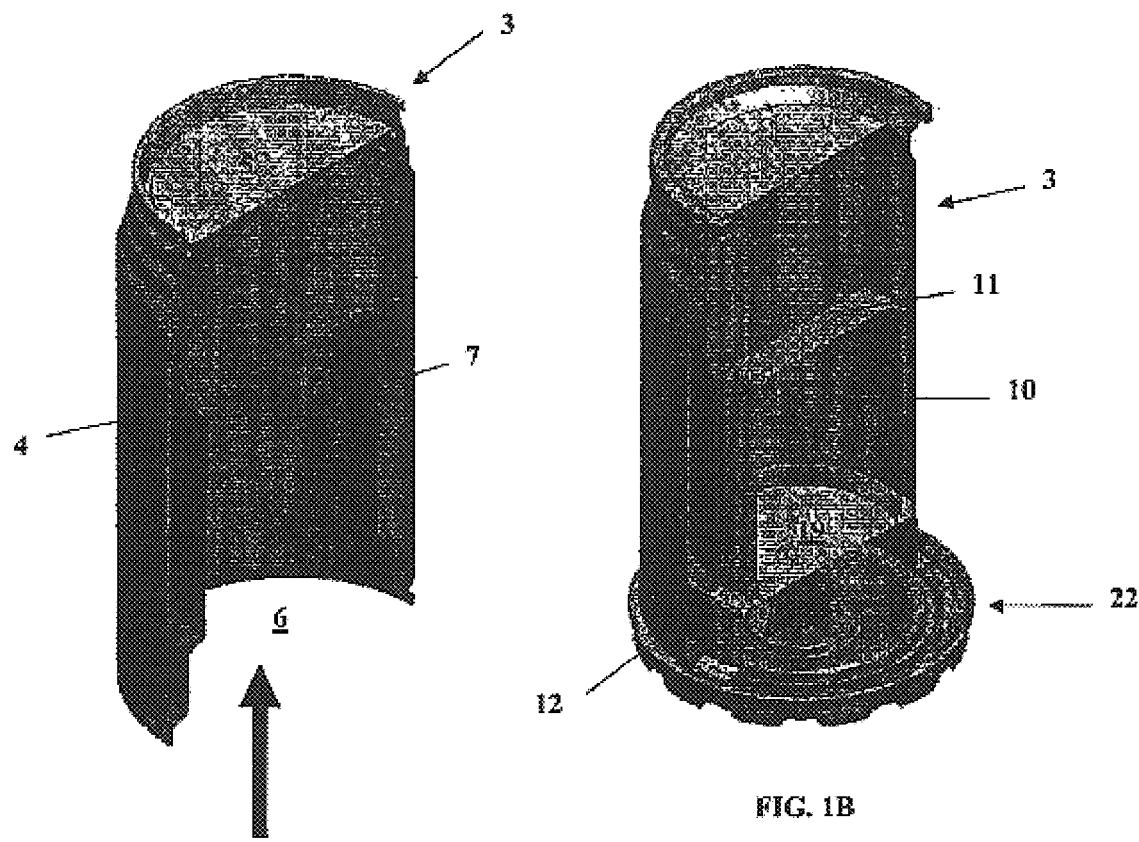
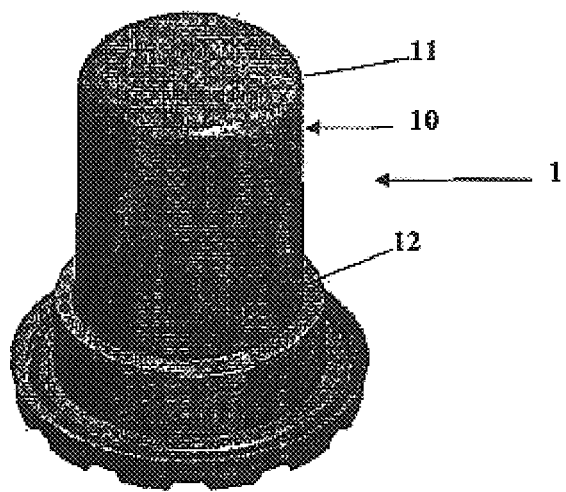
FIG. 1A
FIG. 1B

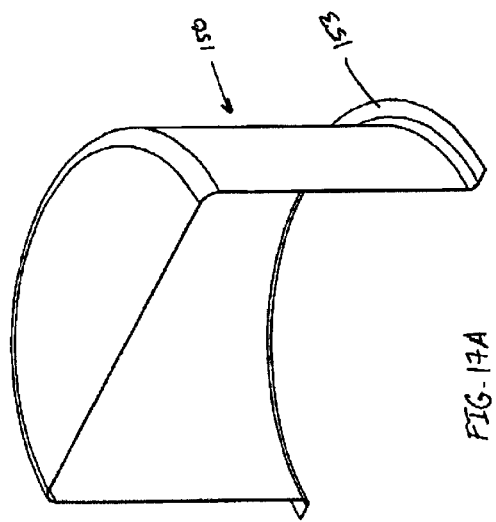
FIG. 17A
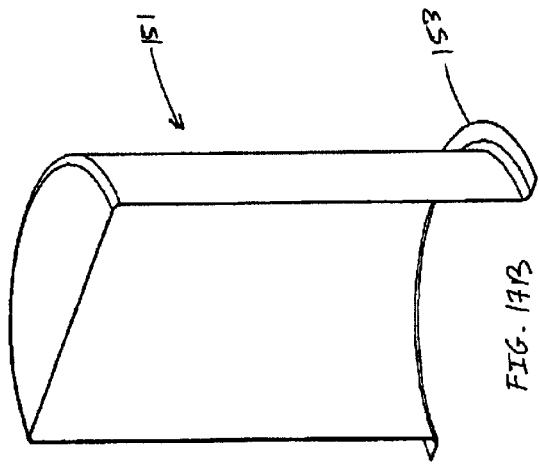
FIG. 17B
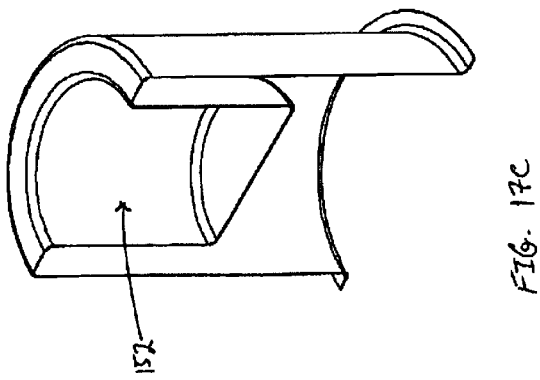
FIG. 17C
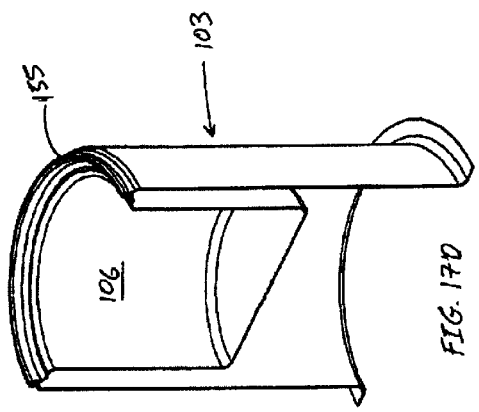
FIG. 17D
FIG. 17

INSERTABLE THERMOTIC MODULE FOR SELF-HEATING CANS

This application is a Continuation-In-Part to U.S. application Ser. No. 10/003,877 filed on Oct. 25, 2001, which claims benefit of Provisional 60/288,184, filed May 2, 2001, which is incorporated herein by reference.

BACKGROUND OF THE INVENTION

The present invention relates to self-heating cans or other containers holding beverages, food, medicine, epoxy resins and other materials that it is desired to heat before consuming or using. In particular, the present invention relates to an insertable themotic module for such self-heating containers.

Containers may have integral or separate insertable modules for warming materials in the container, such as Japanese sake, coffee, or soup. Examples of such self-heating containers with integral thermic modules are disclosed in U.S. Pat. Nos. 5,461,867 and 5,626,022, issued to Scudder et al and an example of a separately insertable module is disclosed in U.S. Pat. No. 6,134,894 to Searle, et al. Such containers typically include an outer can or body, in which the food or beverage is sealed and an elongated cavity or chamber which extends into the container body from the bottom end. The cavity is sized to accommodate the thermic module. The thermic module normally contains two chemical reactants which are stable when separated from one another, but when mixed in response to actuation of the thermic module by a user, produce an exothermic reaction (or, alternatively, an endothermic reaction) and thereby heat (or cool) the contents of the container. This elongated cavity functions as both a chamber in which to contain the reaction and a heat-exchanger for transferring heat between it and the surrounding contents of the container body. The thermic module usually has two chambers, each of which contains one of the chemical reactants, separated by a breakable barrier such as metal foil. Typically, one of the reactants is a liquid, and the other is in a powdered or granular solid form. Calcium oxide (quicklime) and water are examples of two reactants known to produce an exothermic reaction to heat the container contents. Other combinations of reactants (e.g. ammonium nitrate and water) produce endothermic reactions to cool the container contents. The thermic module cavity is normally sealed by an end-cap. The outside of the end-cap will serve as an actuator button that a user may depress to initiate the heating or cooling. The end-cap typically has a pushrod or similar prong-like member that extends from the actuator button nearly to the breakable barrier. Depressing the actuator button forces the prong into the barrier, puncturing it and thereby allowing the reactants to mix. The heat produced by the resulting exothermic reaction (or, alternatively, used by a resulting endothermic reaction) is transferred between the reaction chamber of the thermic module and the contents of the container body by conduction. The internal walls of the cavity may be fluted or pleated to promote such heat conduction. Exothermic reactions also typically generate a gas and/or steam, which is allowed to escape through vents in the end of the container. The user inverts the container and, when the contents have reached the desired temperature, consumes the contents. The end of the container body opposite the cavity has a seal or closure, such as conventional beverage container pull-tab or pop-top, that may be opened and through which the user may consume the heated or cooled contents.

One of the disadvantages associated with prior self-heating containers which place the chemical reactants directly into the cavity (i.e. an integral thermic module) is that the reactants typically cannot reliably be placed within the cavity before the container is filled with a food or beverage and subjected to the normal sterilization process. This is because the heat of the sterilization process may damage the reactants. It is generally not desirable to fill, sterilize, and pack the thermic modules into the containers at the same location. This is because the risk of contamination from the chemical reactants and because of the expense operating the module packing step in the same sterile environment required for filling and sealing the food or beverage in the containers. The current practice when employing integral thermic modules is to fill the container with the food or beverage and sterilize the container at one location, and then transport the containers to a second location for combining the container with the integral thermic modules. In some instances, it may even be necessary to return the containers to the original location for labeling, distribution or warehousing.

To be commercially acceptable, self-heating containers must be able to raise the temperature of the product to sufficiently high and in a sufficiently short period of time. An unofficial minimum standard accepted by many in the industry for heating type containers is that the thermic module must be able to raise the contents of the container at least 40° C. in less than 180 seconds.

While patents such as U.S. Pat. No. 6,134,894 to Searle, et al. have disclosed separately formed modules which insert into the cavity of the container, these prior art modules still possess many disadvantages. For example, it is desirable to have the walls of the cavity and those of the thermic module in contact to maximize heat transfer. However, it is often difficult to manufacture thermic module to the exact tolerance which allows the module to readily slide into the cavity and at the same time perfectly fit against the internal walls of the cavity. And while metals such as aluminum have good heat transfer characteristics, inevitably an air gap occurs between the module sidewalls and the internal walls of the cavity and acts as an insulating barrier. Prior art devices such as discussed in the Searle patent suggest using gels to fill air gaps, but gels have limited shelf-life because they tend to dry out.

It would be highly desirable to manufacture the modules from a material less expensive than metal, such as plastic. However, it has generally been accepted in the industry that the low thermal conductivity of plastics renders it totally impractical for a plastic thermic module to heat a container's contents to the desired 40° C. in less than 180 seconds. It is not believed that the prior art separately formed thermic modules are capable of reliably achieving this temperature/time requirement, particularly when dealing with standard sized soft drink cans. Therefore, a separately formed module capable of achieving this temperature/time standard would be an important and significant improvement in the art.

Another disadvantage existing in prior art devices is the process for manufacturing containers having a thermic module. This process includes three steps: 1) forming a cylindrical can body (such as by rolling and seaming a sheet of metal); 2) forming a separate bottom portion of the can which includes a thermic cavity and then attaching this bottom portion to the cylindrical body; and 3) crimping a lid onto the top of the cylindrical body. It would be a considerable improvement in the art if this process could be shortened to only two steps.

SUMMARY OF THE INVENTION

The present invention comprises a thermic module for a self-heating container. The container includes a bottom end with a cavity having internal walls formed therein for receiving the thermic module. The thermic module will be comprised of a first cup having plastic walls and containing a first chemical reactant. The module will also include a second cup containing a second chemical reactant and a dividing wall positioned between the first and second cups such that the first and second chemical reactants cannot mix. An end cap will be positioned below the second cup and will retain the second chemical reactant within the second cup. An actuator for puncturing the dividing wall will be positioned between the end cap and the dividing wall. Finally, the walls of the first cup are formed of a plastic of sufficient thinness and having a sufficiently low Vicat Softening Point such that the plastic walls will expand into contact with the internal walls of the container cavity upon mixing of the first and second chemical reactants.

Another embodiment of the present invention will include a pressure activated vent used in combination with the container such that the pressure created within the module by the mixing of the first and second reactants must exceed about 2 psi before the vent is activated.

A still further embodiment includes a self-heating container which has a container body with a thermic heating module cavity and a thermic heating module engaging the cavity. A vent is combined with said thermic heating module with the vent being designed to resist an internal pressure of more than 2 psi prior to activation of the thermic heating module and resisting internal pressure within the heating module of no more than 2 psi after activation.

A further embodiment of the present invention includes a self-heating container having a container body with an overall volume of approximately 355 ml and an internal beverage containing section formed within said container body which has approximately 210 ml of beverage therein. A thermic heating cavity is formed in a bottom portion of the container body and has a first and second reactant that when mixed, are capable of raising the 210 ml of beverage at least approximately 50° C. Alternatively the overall volume may be approximately 475 ml with a beverage containing section having approximately 305 ml of beverage and the thermic module heating the 305 ml of beverage to at least approximately 50° C.

A further embodiment of the present invention includes a method of manufacturing a container having a thermotic module cavity. This method comprises the steps of: (a) providing a single metal starter piece; (b) through a drawing process, elongating the starter piece to a length dimension greater than a final length of the container, including a closed bottom end and an open top end; (c) through a drawing process, indenting the bottom end to form a thermic module cavity in the bottom end; and (d) forming a lid flange around the open top end.

A further embodiment of the present invention includes a self-heating container which comprises a container body having an internal beverage section and a thermic cavity. A liquid reactant positioned in a first section of the thermic cavity and a solid reactant positioned in a second section of the thermic cavity. The solid reactant includes at least 70% by weight CaO and at least 5% by weight of a carbonate from the group consisting of $MgCO_3$, $CaCO_3$, $SrCO_3$, $BaCO_3$, and $RaCO_3$.

A further embodiment of the present invention includes a temperature indicative food or beverage container including a body having thermographic ink in operative contact therewith. The thermographic ink provides a first indication when the container reaches a first temperature and a second indication when the container reaches a second temperature.

A still further embodiment of the present invention includes a self-heating container having a container body incorporating a heating module and a label fitted onto the container. The label includes a first layer formed of a shrink-wrap material and a second insulating layer of a polymer foam material adhered to the layer of shrink-wrap material.

BRIEF DESCRIPTION OF THE DRAWINGS

FIG. 1A is a partial sectional view of a self-heating container and insertable thermic module of the present invention.

FIG. 1B is combined sectional view of the self-heating container and thermic module.

FIG. 17 shows several steps in the novel can forming process of the present invention.

DETAILED DESCRIPTION OF THE INVENTION

Figure 2:
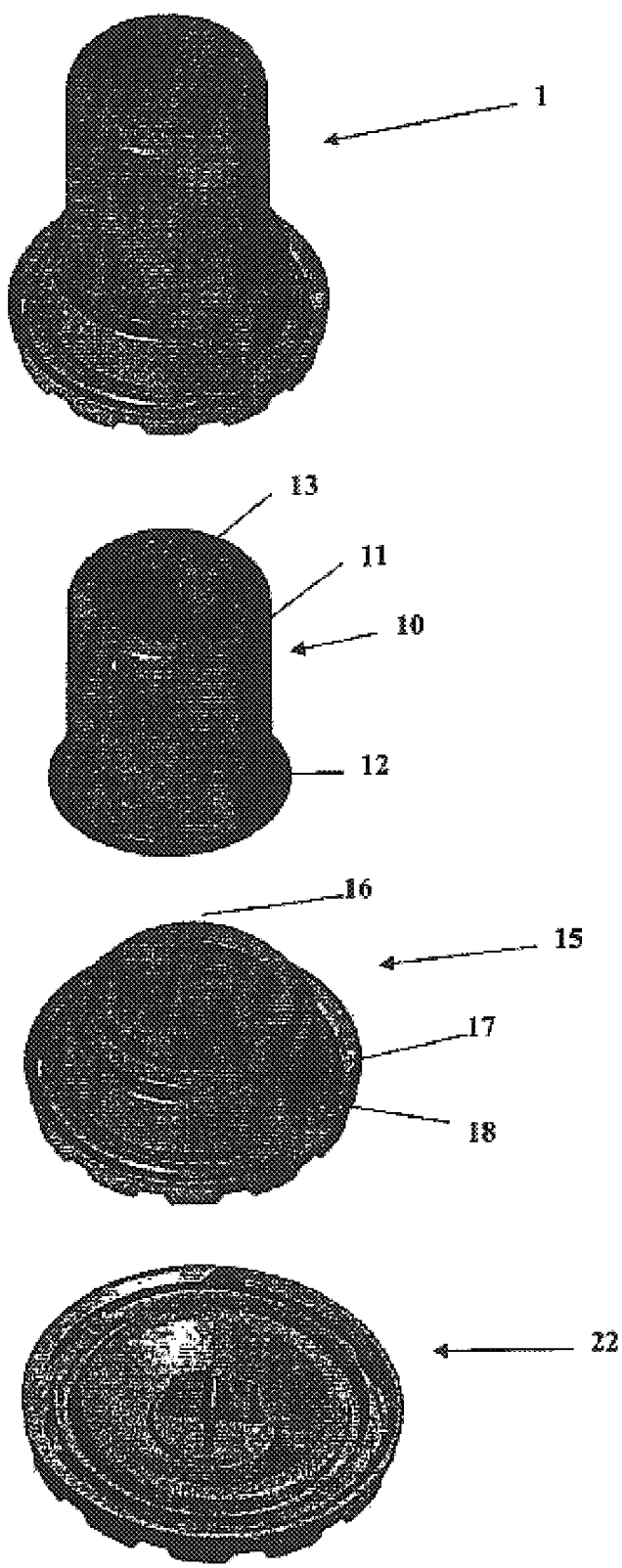
FIG. 2 is an exploded view of the thermic module of the present invention.

FIG. 1A illustrates a self-heating container 3 formed by outer sidewalls 4, top 5, and to inner wall 7. While not shown, it will be understood that top 5 may include a conventional pull tab or pop top opening such as found on typical soda cans. It can be seen how inner wall 7 is generally cylindrical and forms a chamber or cavity 6. While not explicitly shown, the interior wall of cavity 6 may be fluted to provide more surface area to facilitate heat transfer from the thermic module 1 to the contents of container 3. Thermic module 1 is sized such that it can be inserted into cavity 6 as suggested by FIG. 1B. The main components of thermic module 1, upper cup 10, lower cup 15, and end cap 22 are best seen in FIGS. 1B and 2. First or upper cup 10 will be formed of a generally cylindrical sidewall 11 and integral top 13. Upper cup 10 will also have a cup lip 12 extending around the base of sidewall 11. It can be seen in FIG. 1B how the interior of upper cup 10 is hollow. FIG. 2 also shows second or lower cup 15, which includes pressure fit ring 16, cylindrical sidewall 17, and a bottom rim 18. The top of lower cup 15 will be formed by breakable barrier 19 which will be explained in more detail below.

Figure 3A:
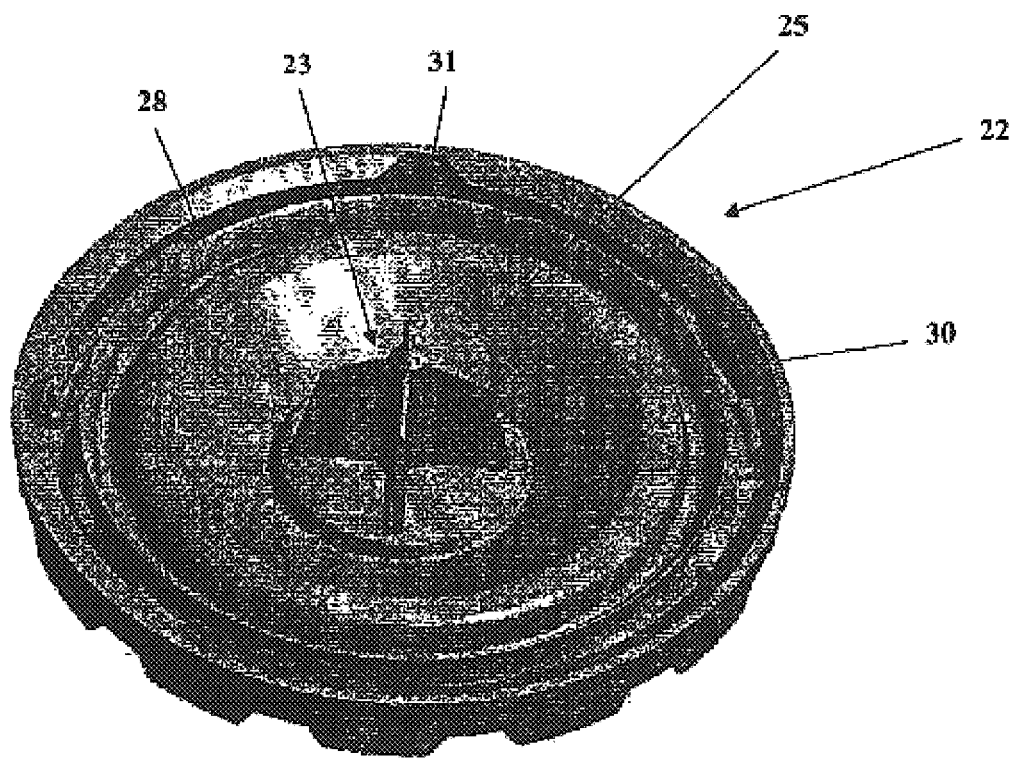
FIG. 3A is a top perspective view of the end cap of the thermic module.
Figure 3B:
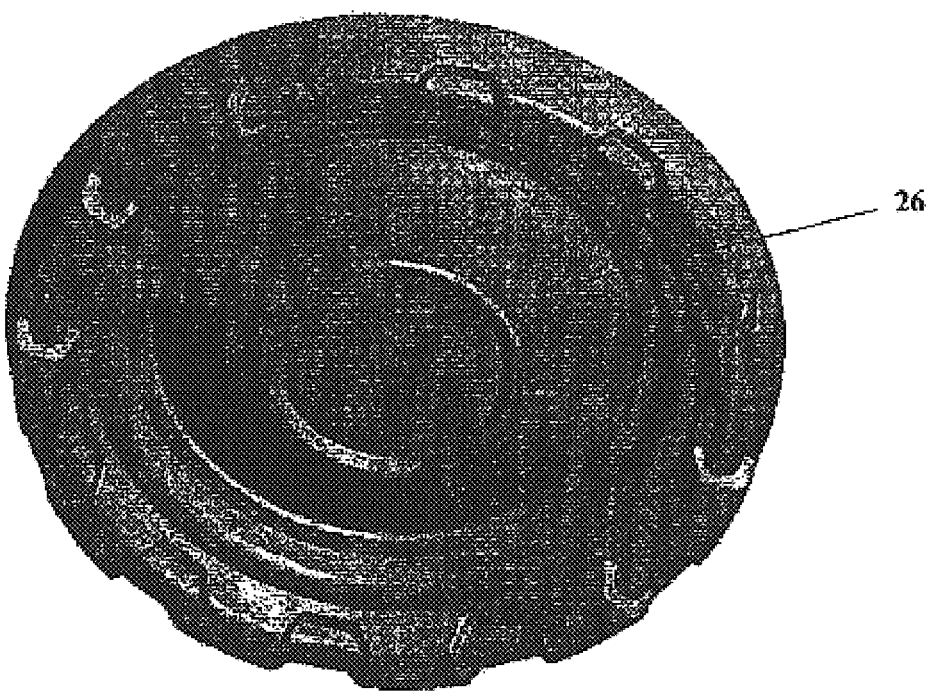
FIG. 3B is a bottom perspective view of the end cap of the thermic module.
Figure 3C:
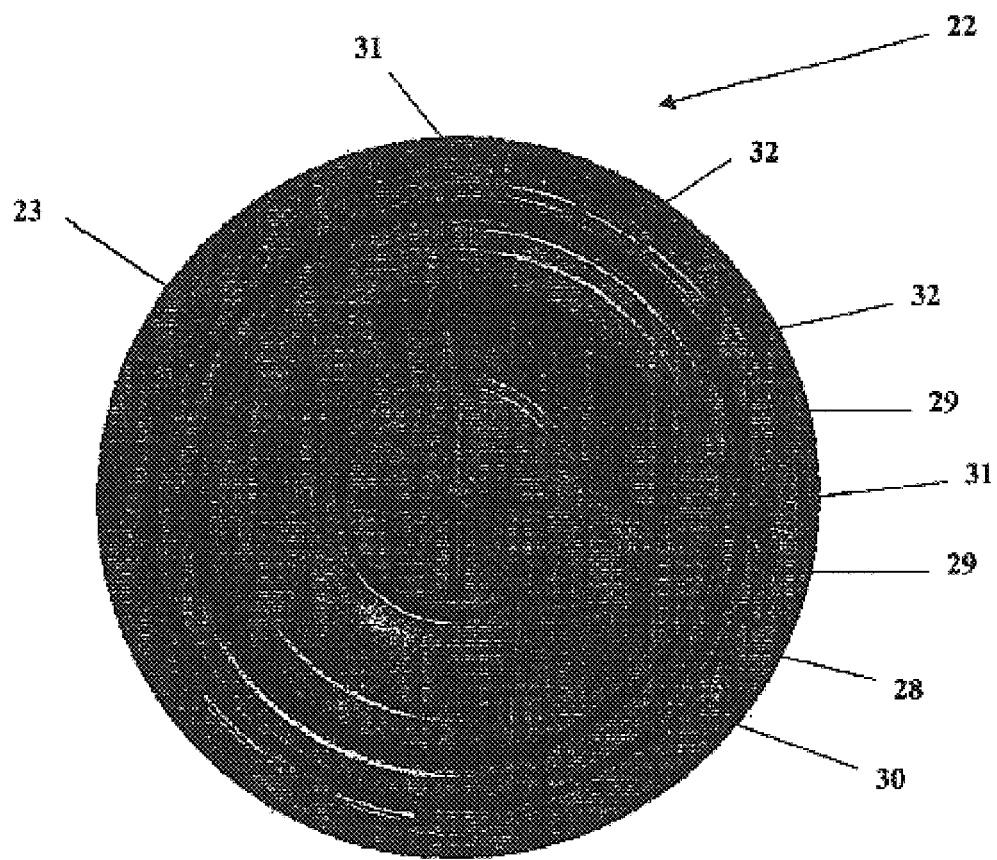
FIG. 3C is a top planar view of the end cap of the thermic module.
Figure 4:
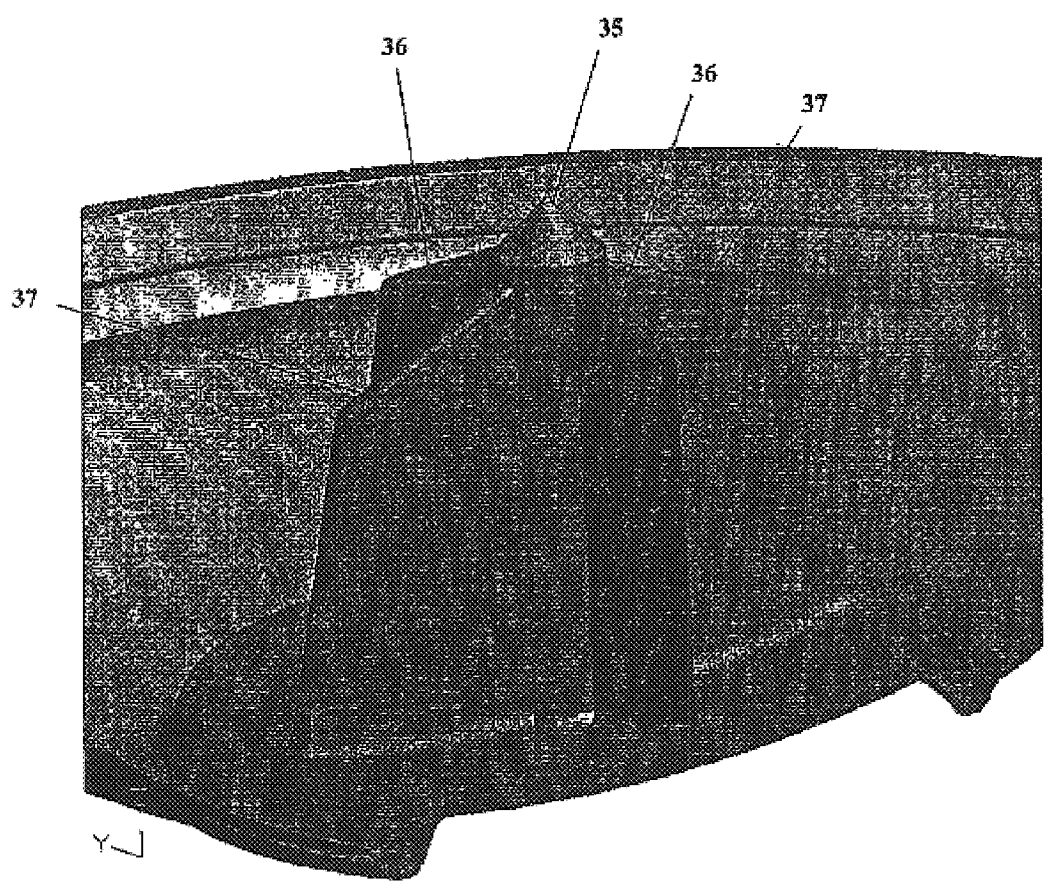
FIG. 4 is a view of the actuator attached to the end cap.
Figure 10A:
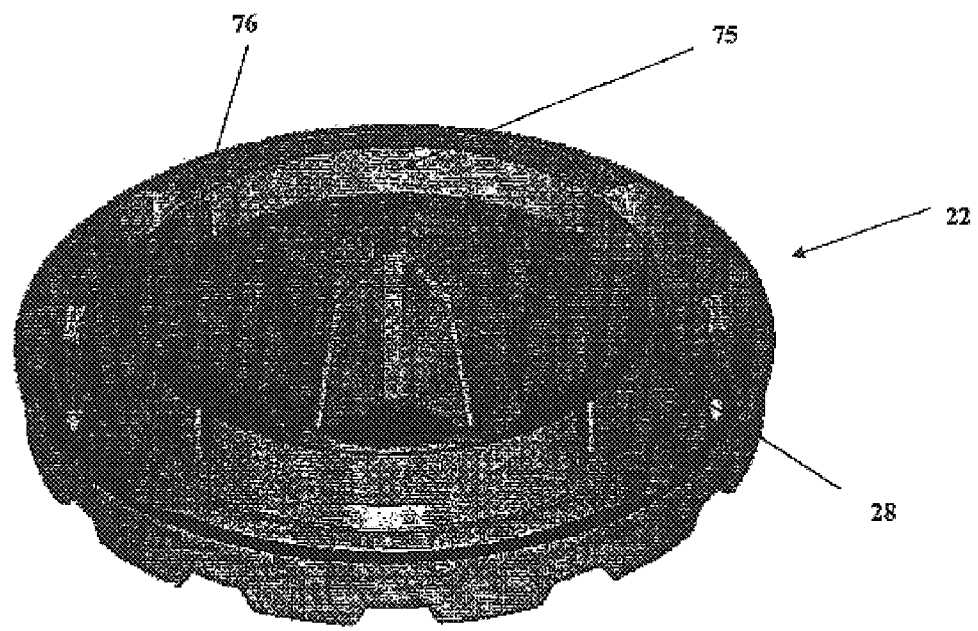
FIG. 10A is a perspective view of an alternate embodiment of the end cap.
Figure 10B:
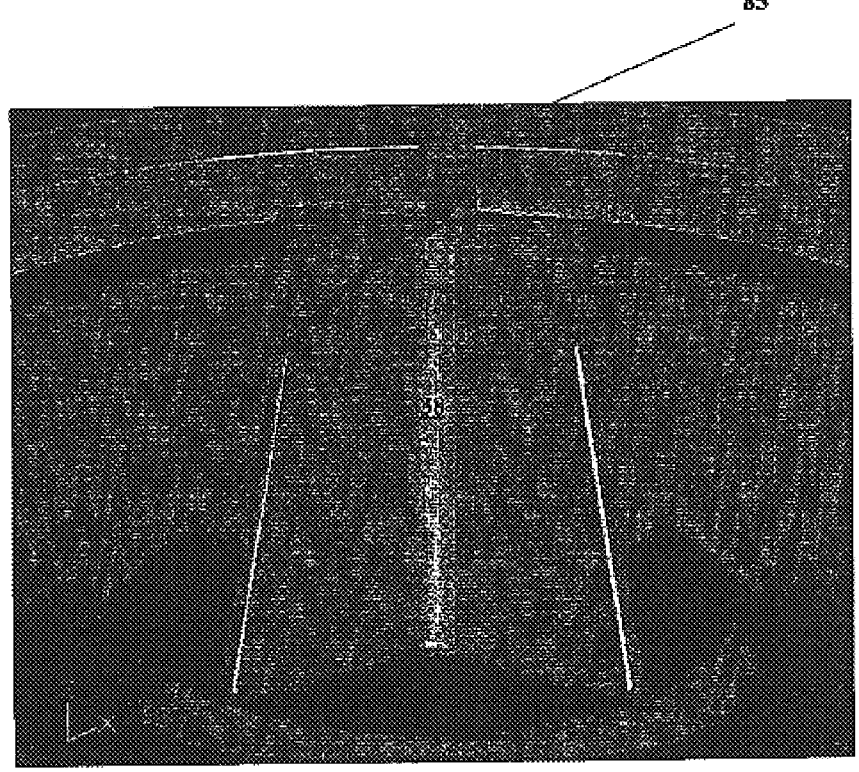
FIG. 10B is an enlarged view of the piercing point in an alternate embodiment of the actuator.

End cap 22 shown in FIGS. 1A and 2 is best seen in FIGS. 3A–3C. FIG. 3A shows how the top side 25 of end cap 22 will include actuator 23, pressure vent seal 28, can attachment pressure grip 30, and container body vents 31. FIG. 3C best illustrates two further elements of end cap 22: lower cup vents 32 and container snap grips 29. Bottom side 26 of end cap 22 seen in FIG. 3B illustrates how end cap 22 will be formed of a mid-section 27 with an actuator button 24 centered therein. Mid-section 27 will be formed of a sufficiently flexible material which will allow actuator button 24 to be easily moved inward when force is applied thereto. It will be understood that actuator button 24 on bottom side 26 is immediately opposite actuator 23 located on top side 25. Actuator 23 extends upward from top side 25 of end cap 22 and further includes the elements shown in FIG. 4. Actuator 23 will comprise a center post 38 with a sharp piercing point 35 formed on its top. In the embodiment shown in FIG. 4, four fins 39 will extend from center post 38, but naturally the invention encompasses designs with fewer or more fins 39. Two of the fins 39 will have sharp cutting edges 36 formed at their tops. The other two fins 39 will have more rounded spreading edges 37 formed at their top. In a preferred embodiment, actuator 23 will be formed at a height such that it nearly touches breakable barrier 19, for example the top of actuator 23 being about 2 mm+/–1 mm away from breakable barrier 19. However, this is a preferred height and other heights of actuator 23 are intended to come within the scope of the present invention. A preferred embodiment of the piercing point on center post 38 is seen in FIG. 10B. This figure illustrates a sloped blade edge 85 formed thereon. This embodiment of center post 38 will exhibit a superior ability to pierce breakable barrier 19, but will still include fins with cutting and spreading edges extending away from center post 38.

Figure 9:
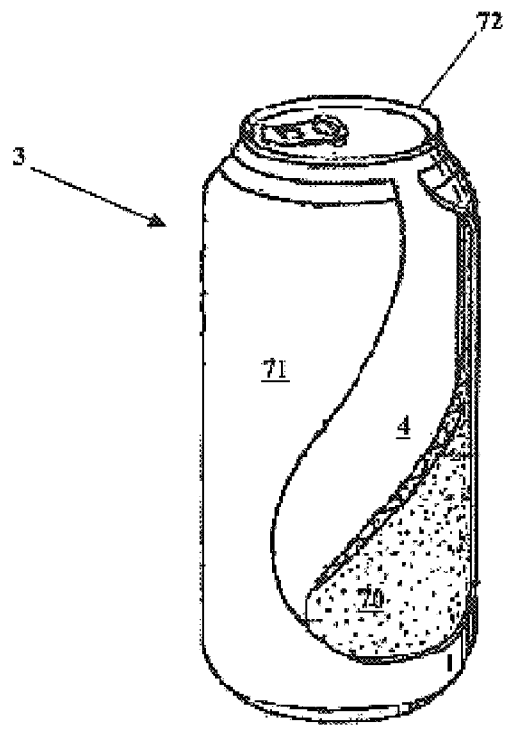
FIG. 9 is a perspective view showing the insulating sleeve which will typically cover the container.

FIG. 1A shows container 3 and thermic module 1 in the assembled state with thermic module 1 having been inserted into cavity 6. Thermic module 1 itself has been assembled by inserting lower cup 15 into the bottom of upper cup 10 such that upper cup lip 12 slides over the top of pressure fit ring 16 of lower cup 15. End cap 22 then engages the lower edge of container side wall 4 and bottom rim 18 of lower cup 15 and is secured thereto as described below. FIG. 9 illustrates how container 3 may also include a sleeve of insulation material 70 such as corrugated cardboard, a plastic shrink wrap cover 71 containing the container label and other printed matter, and a plastic top rim 72 to prevent excessively warm metal from contacting a drinker's lips.

Figure 5A:
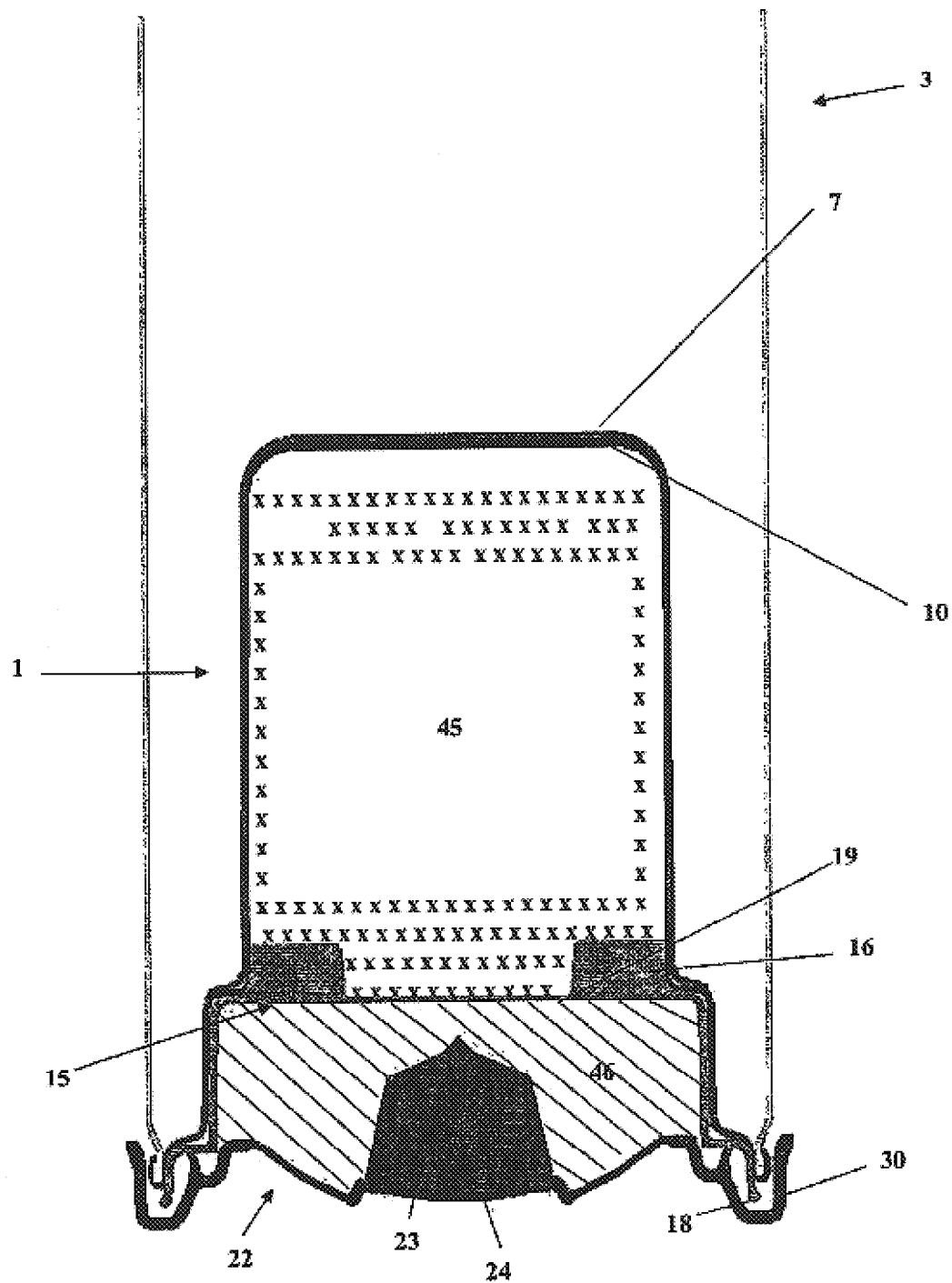
FIG. 5A is a cross-sectional schematic of the thermic module containing chemical reactants.

The operation of thermic module 1 may be understood with reference to the cross sectional view of FIG. 5A. This figure illustrates container 3 having thermic module 1 inserted therein. The interior of upper cup 10 is filled with a first chemical reactant 45 which is a solid material in one preferred embodiment of the invention. Lower cup 15 is shown filled with a second chemical reactant 46 which is a liquid material is this embodiment. The joint between upper cup lip 12 and pressure fit ring 16 is hermetically sealed to prevent the unintentional mixing of reactants 45 and 46. Normally a user will turn the container upside down prior to activating the thermic module 1. To activate thermic module 1, force is placed on actuation button 24 which causes actuator 23 to engage and penetrate breakable barrier 19. When the force is released from actuator button 24, it will flex back to its original position and reactants 45 and 46 will be allow to mix through the puncture in barrier 19. The mixing of reactants 45 and 46 will begin the exothermic reaction which will eventually heat the content of container 3 to the desired temperature. In one embodiment, end cap 22 will be formed of a transparent of translucent plastic. The liquid reactant may be colored to allow the user to readily see when all the liquid reactant has drained into the upper cup. While prior art devices have employed ink to color the liquid reactant, the present invention utilizes food coloring which is completely harmless if inadvertently ingested by an individual such as a small child.

One aspect of the present invention involves the type and quantity of reactants 45 and 46. While it is know in the art for reactant 45 to comprise calcium oxide (or "quicklime") and reactant 46 to comprise water, it has been discovered that particular ratios of water to quicklime will more efficiently create heat for transfer to the contents of container 3. This is of particular importance when dealing with a standard soda-sized can which must accommodate 210 ml of beverage, thus leaving approximately 115 ml of volume to form cavity 6 and house insert 1. In order to obtain the desired heating of 210 ml of liquid by 40° C. in less than 180 seconds, one prefered ratio of water to quicklime is 27 g water to 74 g quicklime to give a the total weight of water to total weight of quicklime ratio of approximately 0.36. However, a wider range of ratios such as between about 0.30 and 0.40 or even between about 0.2 and 0.50 may generate the desired heating in the desired time if, as is explained further below, pressure is generated within the thermic module and/or the optimal materials are used to construct the thermic module. Typically, the minimum weight of quicklime to heat 210 ml of fluid should be approximately 55–60 g.

One preferred form of quicklime comprises a minimum of 91.0% total CaO, a maximum of 2.0% MgO, a maximum of 2.0% CO2, a maximum of 0.5% SiO2, a maximum of 0.2% Fe2O3, a maximum of 0.2% Al2O3, and a maximum of 5.0% CaCO3. The quicklime has a hardness of about 2.5 to 3.0 on Moh's scale and a specific gravity of 3.0–3.3. The granuals of the quicklime will range in average diameter from about 0.5 to 6 mm, or more preferably about 1 to 5 mm, or most preferably having a majority of granuals being approximately 2–3 mm. Quicklime meeting the specifications described above is available from MCB Industries located in Perak, Malaysia. This type of quicklime is generally not the fastest reacting quicklime available, but does have the favorable characteristic of tending to provide a steady increase in temperature during the reaction period. Additionally, while pure water and quicklime are in many cases suitable reactants, it is well known to add different chemical agents to the water and/or quicklime in order to vary different parameters of the reaction process. All such modifications of the water and/or quicklime reactants are intended to come within the scope of the present invention.

Figure 5B:
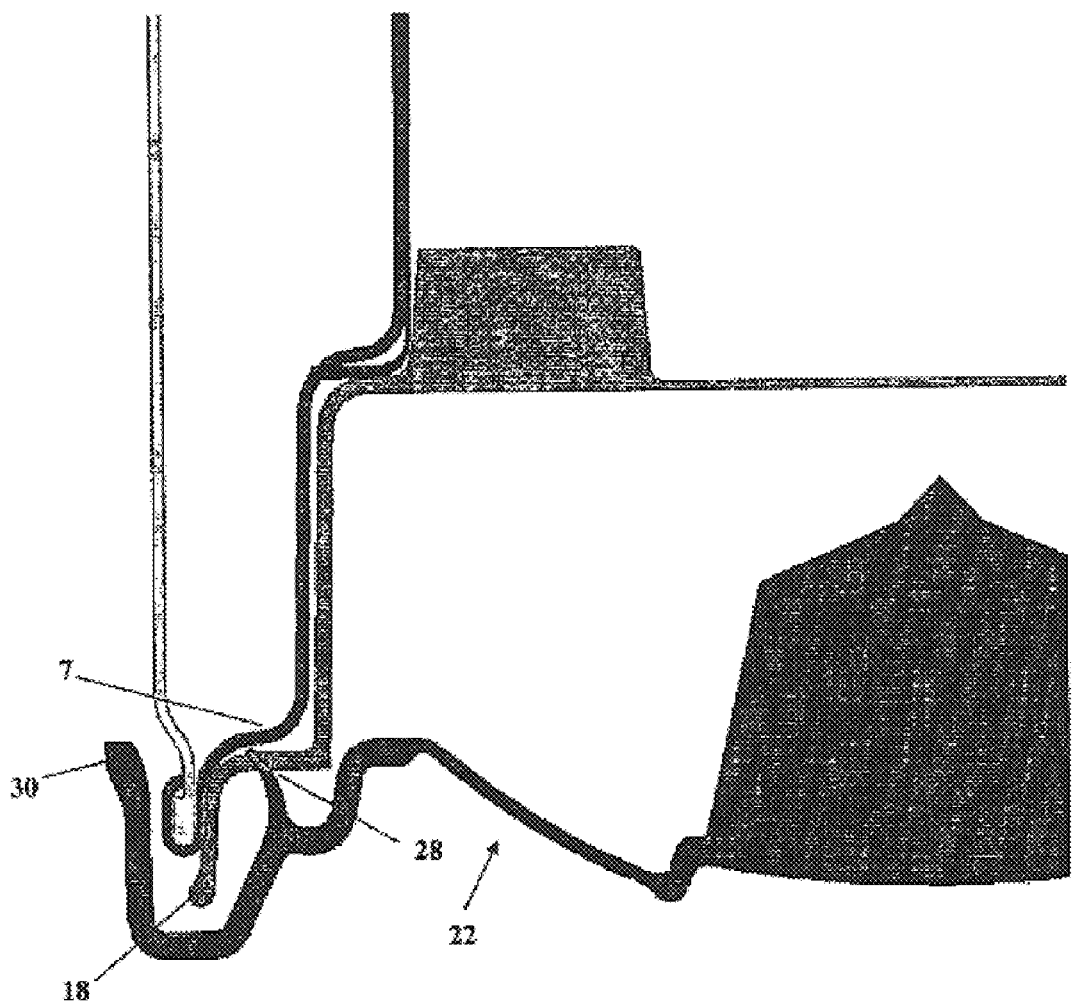
FIG. 5B is a detailed view of the container wall showing a section taken through the container body vent formed in the end cap.
Figure 5C:
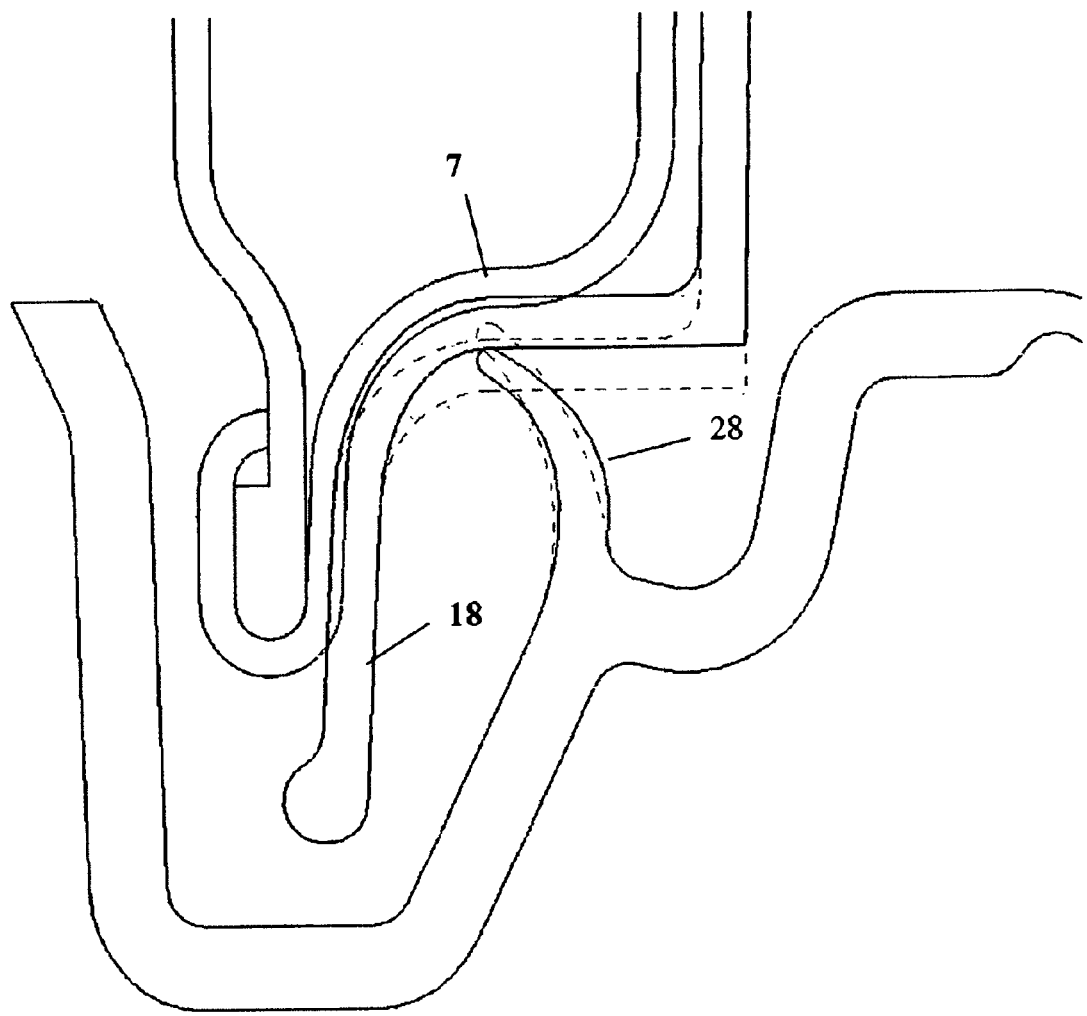
FIG. 5C is similar to FIG. 5B, but illustrates the deformation of the pressure vent seal formed in the end cap.
Figure 5D:
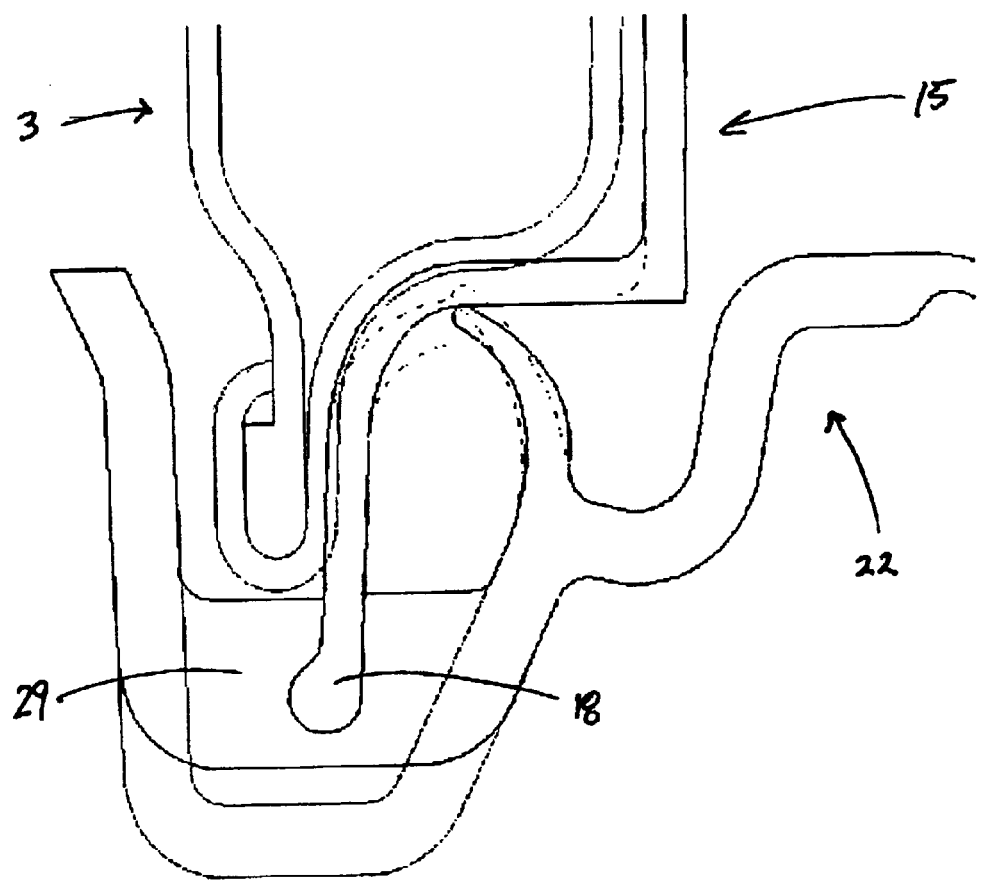
FIG. 5D is another sectional view taken through the snap-grip formed in the end cap.

Another aspect of the present invention involves creating a pressure seal within thermic module 1 in order to raise the temperature during the reaction of the water and quicklime. At zero gauge pressure, the water changes phase at 100° C. and the core temperature in the thermic module does not rise much above that mark. However, by sealing the thermic module and allowing the internal pressure to rise, the temperature in the thermic module may be increased. For example, a pressure of 5.5 to 6 psi gauge has been found to raise the temperature in the module to 108 to 110° C. However, even 2 psi will contribute to greater heating although it generally may not be practical to allow the pressure to exceed about 7 to 8 psi gauge. FIG. 5B is a detailed view of how pressure vent seal 28 of end cap 22 will be in a position to press against bottom rim 18 of lower cup 15. The dashed lines in FIG. 5C show vent seal 28 when it is in a relaxed state and has not been pressed against bottom rim 18. The solid lines illustrate how vent seal 28 is slightly deformed and pressed firmly against bottom rim 18 after end cap 22 is placed on the bottom of container 3 and snap grip 29 securely grasps the bottom edge of rim 18 as seen in FIG. 5D. Vent seal 28 also tends to press sidewall 17 of lower cup 10 into cavity wall 7, thereby preventing steam from escaping between lower cup 10 and cavity wall 7. Initially, as pressure increases within thermic module 1, vent seal 28 remains in place and is able to contain the increasing pressure. However, as the pressure reaches 5 to 7 psi, vent seal 28 is designed to fail and fold backwards. While there is not sufficient space for escaping gas to move past the connection of bottom rim 18 and snap grips 29 as seen in FIG. 5D, the space provided by chemical cup vents 32 and body container vents 31 (see FIG. 5C) will allow gas to escape under bottom rim 18 once vent seal 28 has been deflected. Gases flowing into chemical cup vents 32 will be able to flow laterally to reach the nearest body container vent 31. When the steam enters body container vents 31, it will be directed up the sides of end cap 22 and between the corrugated insulating sleeve 70 (FIG. 9) and the sidewall 4 of container 3. This aids in transferring more of the escaping heat to the container contents before the steam (much cooled) is eventually dispersed slowly from the top of insulating sleeve 70 near the top of the container. This also prevent excessively hot steam escaping directly out of end cap 22 and potentially scolding the user of the container. Because the present invention increases pressure within module 1, wider variations in the water to quicklime ratios may be tolerated and still achieve the desired degree of heating in the desired time limits.

While most of the water reactant will either combine with the quicklime or be turned to steam, in certain instances small amounts of water may be remaining in end cap 22 as the pressure begins to vent. When using the end cap 22 seen in FIG. 3, this end cap may have the undesirable effect of allowing the venting steam to drive the small amount of water out of end cap 22, causing the base of the can to sputter small amounts of hot water. This would be a commercially undesirable effect. To prevent this phenomenon, an alternate embodiment of end cap 22 is shown in FIG. 10A. Positioned on the inside perimeter of pressure vent seal 28 is a ridge ring 75. Ridge ring 75 will have a plurality of gaps 76 formed along its perimeter. While not shown in the Figures, it can be understood how ridge ring 75 will fit against the inside wall of lower cup 10 when the thermic module is assembled. If the outside diameter of ridge ring 75 is approximately equal to the inside diameter of lower cup 10, the gaps 76 will allow ridge ring 75 to flex slightly inward and insure a tight fit against lower cup 10. It has been found that ridge ring 75 successfully prevents any water retained in end cap 22 from being sputtered out from the bottom of the can when the pressure is vented from the thermic module during operation.

A still further inventive aspect of the present invention is the material from which thermic module 1 is constructed. As mentioned above, a serious limitation of prior art thermic inserts was the difficulty in insuring contact between the inner wall of the cavity and the wall of the thermic module. Additionally, the prior art has generally considered a thermic module constructed of plastic to be impractical due to the poor heat transfer properties of plastics. However, the present invention has overcome these limitations and provides a effective thermic insert constructed of plastic.

Referring back to FIG. 2, upper cup 10, lower cup 15 and end cap 22 will all be constructed of plastic in one preferred embodiment of the present invention. It is important that upper cup 10 be of a plastic type and thickness that exhibit several characteristics. First, at standard temperatures and pressures, upper cup 10 should have sufficient strength and be sufficiently rugged that thermic module 1 may be easily be manufactured in one location and then transported to another for insertion into container 3 when assembling the complete self-heating container. Naturally, upper cup 10 should also be capable of withstanding rigorous handling by workers who are assembling the completed self-heating container. Additionally, upper cup 10 should be impermeable to water and water vapor. At the same time, when thermic module 1 is heated and internal pressure builds, the plastic of upper cup 10 should be sufficiently thin and ductile such that it uniformly expands into contact against virtually the entire inner wall of cavity 6.

To achieve these characteristics, applicant has found that the plastic from which upper cup 10 is formed should have plasticity qualities which may be defined by the Vicat Softening Point (VSP) and that the walls of various elements of the module should have a certain range of thicknesses. While the present invention is not limited to a particular plastic compound, a preferred embodiment of upper cup 10 is constructed of polyvinyl chloride (PVC) or polystyrene (PS), ideally through a vacuum forming process. However, other plastics, including but not limited to low density polyethylene, high density polyethylene, polypropylene, or even rubberized plastics or latex plastics may be suitable under certain circumstances for the various elements of module 1. Additionally, the walls of upper cup 10, like the walls of other elements of module 1, could vary between about 0.001 mm to 0.65 mm depending upon the type of plastic used. More preferably, these wall thickness will vary from about 0.05 to 0.3 mm. In regards to upper cup 10, one preferred embodiment will have a will thickness less than about 0.2 mm.

The Vicat Softening Point (VSP) or Vicat Softening Temperature is a standard test (see ASTM D 1525, ISO 306) to determine at what temperature a plastic reaches a certain degree of plasticity. More specifically, the Vicat softening temperature is the temperature at which a flat-ended needle penetrates the specimen to the depth of 1 mm under a specific load. The test procedure generally entails placing a test specimen in the testing apparatus so that the penetrating needle rests on its surface at least 1 mm from the edge. A load of 10N or 50N is applied to the specimen. The specimen is then lowered into an oil bath at 23 degrees C. The bath is raised at a rate of 50° or 120° C. per hour until the needle penetrates 1 mm. The temperature at the 1 mm penetration reflects the point of softening which may be expected when a material is used in an elevated temperature application. The elements of thermic module 1 could be constructed of plastics having a VSP of between about 20° or 140° C., but it is more preferable to use plastics having a VSP of about 60° or 120° C. In one preferred embodiment, the VSP of the less than 0.2 mm wall of upper cup 10 will have a VSP of less than 90° C. It will be understood that VSP and wall thickness may vary from embodiment to embodiment and that the acceptable range of VSP and wall thicknesses are inter-related. For example, when dealing with a plastic having a higher VSP, the walls of the cup will need to be thinner to insure the walls expand properly when heated by the mixed reactants. Conversely, a plastic with a lower VSP would allow the use of thicker walls while still obtaining the desired expansion during heating. The important consideration is that the combination of these properties should provide an upper cup 10 having the characteristics listed above. The cup should be rigid enough to withstand normal handling when at standard temperatures and pressures, but the cup should become plastic and expand against the internal walls of the cavity as it is subject to the heat and internal pressure caused by the reaction of the water and quicklime upon activation of thermic module 1.

Lower cup 15 will be constructed to have different characteristics from upper cup 10. It is not intended that lower cup 15 deform under the heat and pressure of the quicklime's chemical reaction and lower cup 15 should also be impermeable to water and water vapor. Therefore, a preferred embodiment of lower cup 15 will be formed of high density polyethylene (HDPE) through an injection molding process. However, lower cup 15 could be formed of other plastics such as PP or ABS, as long as the other plastics exhibit the functional characteristics described herein. For example, one suitable copolymer is produced by TPC Corporation located in Singapore and is sold under the band name"COSMOPLENE" and the manufacturer number AX164 AED314 A04069. It is desirable for the material of lower cup 15 to have a VSP of at least 120° C. and for sidewall 17, pressure fit ring 16 and bottom rim 18 to be at least about 0.3 mm in thickness. On the other hand, breakable barrier 19 will generally be approximately 0.2 mm thick. While breakable barrier 19 must be thin enough to be readily punctured by actuator 23 and allow water in lower cup 15 to enter upper cup 10, barrier 19 (even when punctured) should remain rigid enough to generally retain the quicklime in upper cup 10 as the reaction takes place.

Figure 11:
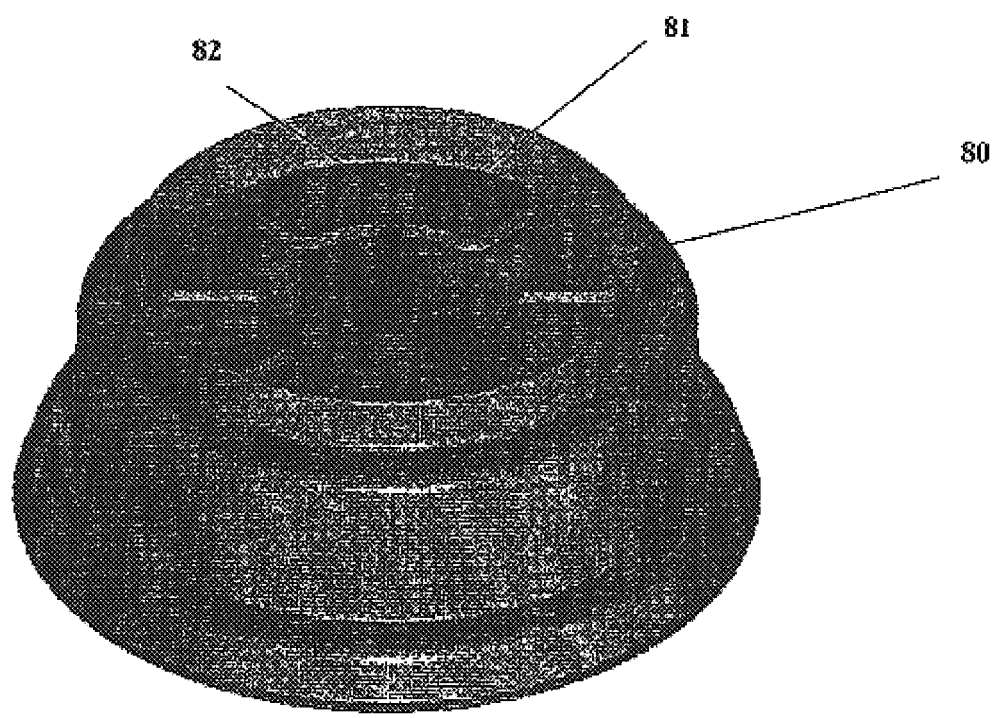
FIG. 11 is a perspective view of an alternate embodiment of the breakable barrier formed in the lower water cup.
Figure 12:
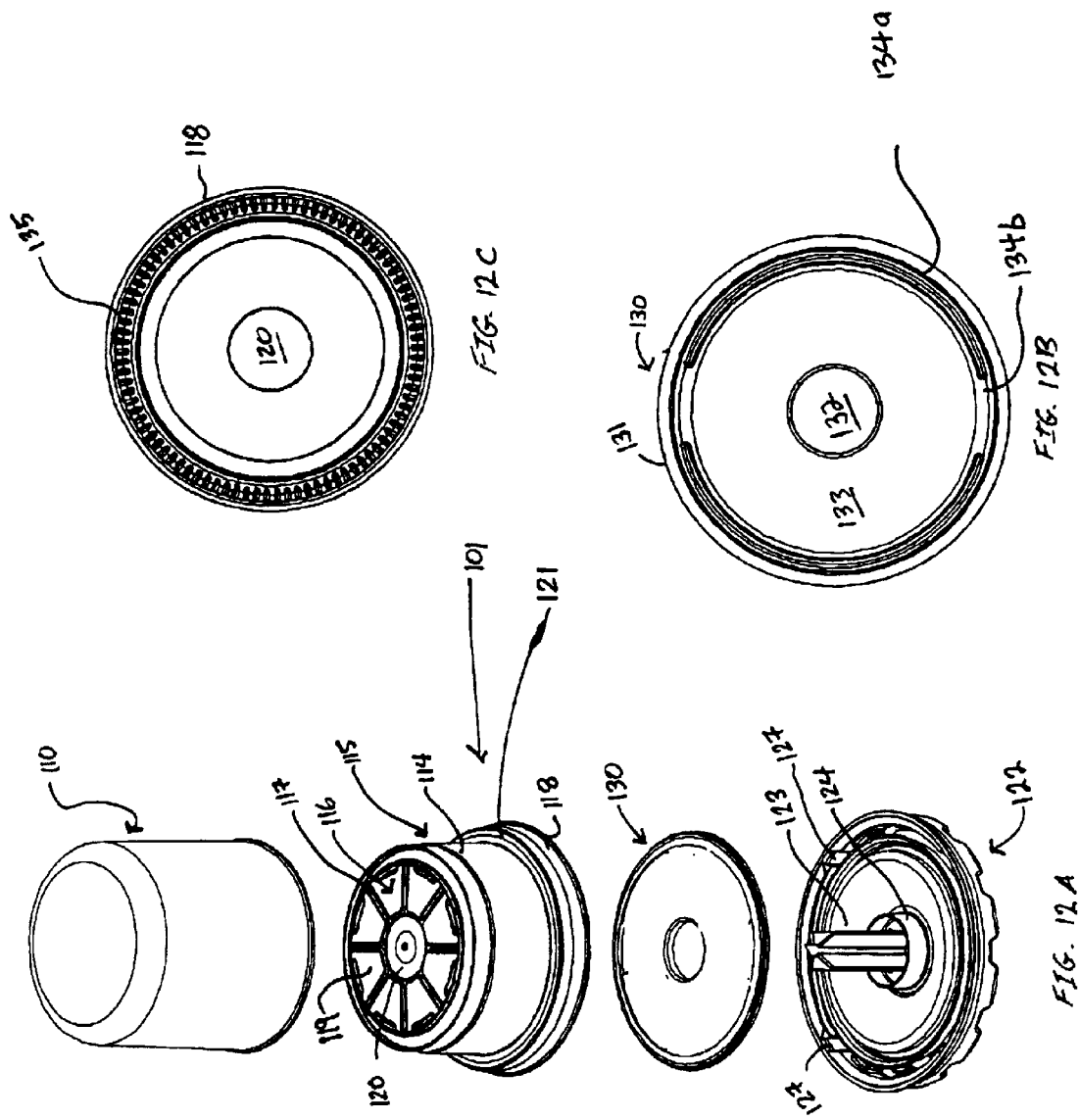
FIGS. 12A–12C illustrate components of an alternate thermic module.

In one preferred embodiment, breakable barrier 19 will be made of two sections. The first section will be formed in the middle of breakable barrier 19 and will generally be a circular area with a diameter of about 20 mm and a thickness of about 0.05 mm to 0.25 mm. Alternatively, the first section could have a break line or some other intentionally formed defect in the plastic. The second section (outside of the 20 mm diameter centre) will preferably be at least about 0.3 mm to 0.4 mm thick but could also be about 0.2 mm to 0.6 mm thick. The upper limit of thickness is not critical except in relation to the cost of using excessive plastic or requiring excessive cooling time. It is desirable to also have break lines in the second section to insure it may give way against expanding lime as explained below. One variation of this preferred embodiment is seen in FIG. 11. FIG. 11 shows a thinner center section 80 which does not require a break line in the center section. Formed around center section 80 are a series of thicker peripheral sections 81. Unlike center section 80, the peripheral sections 81 are separated by break lines 82 which have a reduced thickness (similar to that of center section 80). Without the thicker peripheral sections 81, there could be the opportunity for center section 80 to flex so far upward as the piercing point of the actuator presses against it, that center point 80 could simply be displaced and not pierced. However, peripheral sections 81 make the breakable barrier sufficiently rigid that center section 80 cannot avoid piercing by flexing away from the piercing point. In operation, after center section 80 has been pierced and the lime and water mix, the lime generally begins to expand. It is preferable to have the entire breakable barrier give way and allow the lime to expand into lower cup 15. The break lines 82 help insure the now pierced breakable barrier will more easily split apart and allow the lime to expand into lower cup 15. Naturally the breakable barrier design of FIG. 11 could be used in other embodiments of the present invention, such as a substitute for the breakable barrier 55 seen in FIG. 6.

End cap 22 also should not deform under the quicklime reaction temperatures and should be impermeable to water in its liquid and vapor phases. However, end cap 22 should flexible enough that actuator 23 may move forward when actuator button 24 is pressed and the structural integrity of end cap 22 not be impaired. In an alternate preferred embodiment, end cap 22 will be constructed of a polypropylene (PP) random copolymer. Generally, it is preferred that the copolymer have a melt flow index of about 20, a flexural modulus of less than 900 MPa, and that the material have good clarity. End cap 22 may be formed through any suitable process such as an injection molding process or a vacuum molding process. One suitable copolymer is produced by SCT Corporation located in Thailand and is sold under the band name "EL-PRO" and the manufacturer number W03/Y44 #3. Another suitable copolymer is produced by BASF Corporation located in Germany and is sold under the brand name "Novolen" and the manufacturer number 3340 NC. The preferred embodiment of end cap 22 shown in the figures should have a wall thickness of greater than about 0.3 mm and should have a VSP of at least about 120° C. Naturally actuator 23 may be formed of a somewhat greater thickness to insure it has sufficient rigidity to puncture breakable barrier 19.

Figure 6:
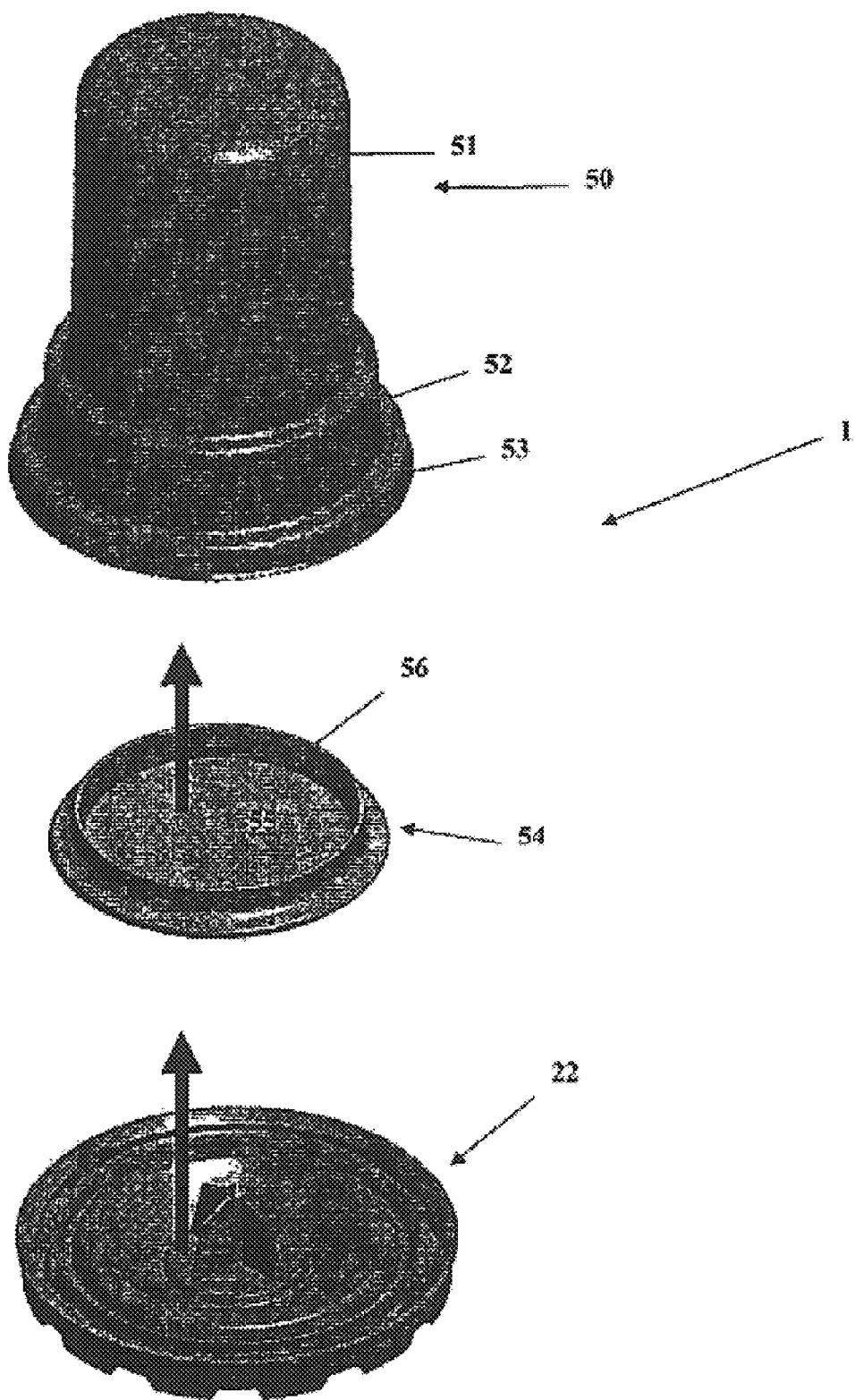
FIG. 6 illustrates an alternative embodiment of the thermic module.
Figure 7:
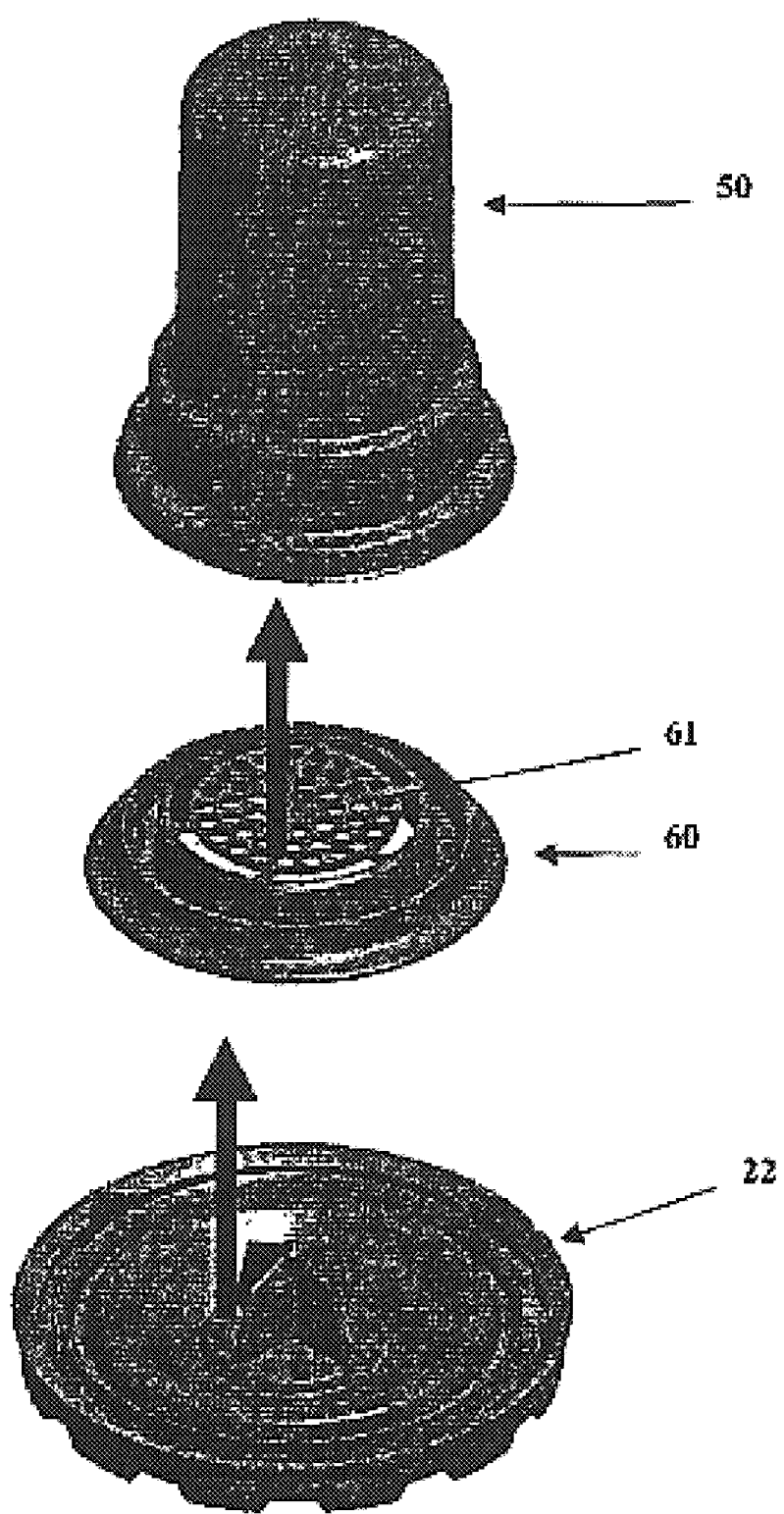
FIG. 7 illustrates an another alternative embodiment of the thermic module.
Figure 8:
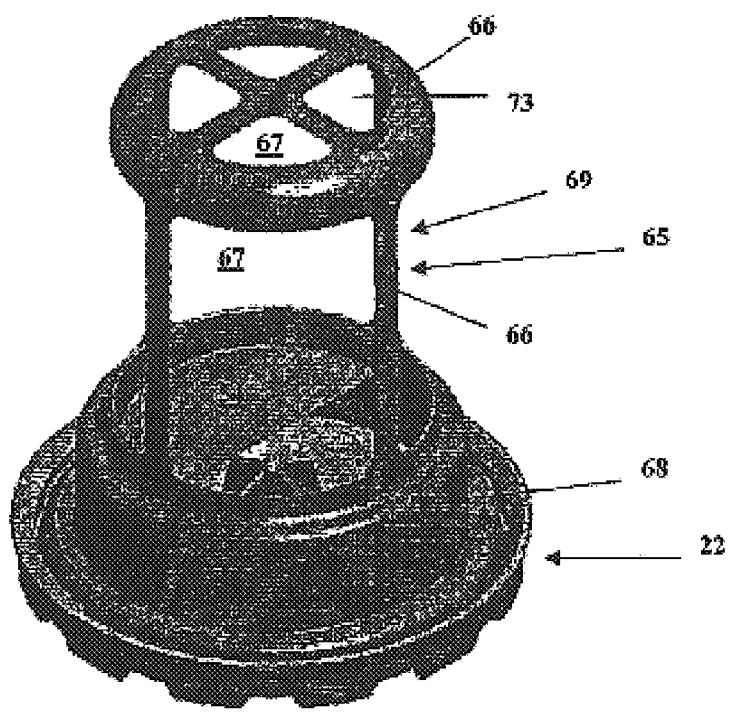
FIG. 8 illustrates a third alternative embodiment of the thermic module.

Still further embodiments of the present invention may be seen in FIGS. 6–8. FIG. 6 illustrates an embodiment where integral cup 50 is composed of upper cup sidewalls 51, lower cup sidewalls 52 and bottom rim 53. A dividing wall insert 54 with sealing ring 56 and breakable barrier 55 will fit into integral cup 50 and come to rest at the junction of sidewalls 51 and 52. The bottom rim 53 will engage end cap 22 as previously described. It can easily be understood how a first reactant chamber or cup is formed in the space above breakable barrier 55 and a second reactant chamber or cup is formed in the space between breakable barrier 55 and end cap 22. In all other aspects, the thermic module 1 seen in FIG. 6 will operate in the same manner as the previously described thermic module.

FIG. 7 illustrates an alternate dividing wall insert 60. The breakable barrier 61 will have a perforated support frame which will support a water impermeable sheeting material such as metal foil. Often a breakable barrier constructed only of a sheeting material will be unduly weak and subject to unintentional breakage. However, the addition of a support frame makes a breakable barrier of sheeting material far more reliable. The actuator 23 discussed above with cutting edges and spreading edges would insure penetration of the breakable barrier.

FIG. 8 illustrates an embodiment of thermic module 1 similar to that in FIG. 6 in regards to dividing wall insert 54, lower cup sidewalls 68, and end cap 22. However, the upper cup section 69 is of a significantly different design. The upper cup section 69 will be formed by frame structure 66 which creates a series of windows 67 in place of the solid upper cup walls seen in previous embodiments. Rather than solid plastic sidewalls previously described, upper cup section 69 will have sheeting material 73, such as metal foil, positioned within the windows 67. While only one window 67 is shown with sheeting material 73 for simplicity, it will be understood that all windows 67 would be covered with sheeting material 73. The sheeting material 73 will be attached to frame structure 66 by a convention means such as a high temperature adhesive, heat stamping, spray glue, hot glue, or any other suitable convention method. Sheeting material 73 may be secured in windows 67 such that it contains a certain degree of extra material or "slack". In this manner, when the thermic module is activated and internal pressure builds in upper section 69, sheeting material will bulge outward slightly from windows 67 and thus insure a large contact area (to maximize heat transfer) between the internal walls of the container's cavity and sheeting material 73.

While the above described embodiments overcome many disadvantages found in prior art devices, there are still improvements which can be made. For example, while the above embodiments are capable of heating 210 ml of liquid 40° C. in three minutes, there are situations when it is desirable to achieve higher levels of heating. For example, if the ambient temperature of the beverage being heated is 25° C., a 40° C. increase in the beverage temperature to 65° C. is generally considered adequately warm by most consumers. However, if the ambient temperature of the beverage is only 10° C. or 15° C., a 40° C. increase in beverage temperature will often not be considered adequate. Additionally, the above described embodiments may sometimes have a tendency to generate visible quantities of steam or to generate audible bubbling, percolating or loud popping noises. It also sometimes happens that the particular reactants used produce a "chemical odor" which escaping steam may carry to the user. These characteristics are often deemed undesirable by many consumers. Moreover, the production of steam may seriously inhibit the transfer of the maximum heat energy to the beverage. For example, the conversion of water to steam uses 543 calories per gram of vaporized water and a large amount of this heat energy is lost from the fuel mixture as steam, and results in less heat being transferred to the beverage.

An alternate embodiment of the present invention which overcomes these deficiencies, thermic module 101, is seen in FIGS. 12–18. Viewing FIG. 12, thermic module 101 has several features similar to the previously described thermic modules such as first cup or lime cup 110, second cup or water cup 115, and end cap 122. However, the dimensions of thermic module 101 are different from previously described thermic modules and will be discussed in more detail below. Water cup 115 is similar to previous embodiments in that it has a breakable barrier 116 formed by a thinned or weakened center section 120, panels 119, and weakened sections 117 formed between panels 119. Water cup 115 will also include a shoulder 121 transitioning into a lower rim 118. However, as seen in a bottom view of water cup 115 shown in FIG. 12C, water cup 115 differs from previous embodiments in that the inside surface of shoulder 121 has a series of ridges 135 formed along its circumference. Ridges 135 need only be a millimeter or two in height, a distance sufficient to allow gas to pass between ridges 135. End cap 122 differs from previous embodiments in having a longer actuator and having a sealing disc push ring 124 whose function is explained below.

Figure 13:
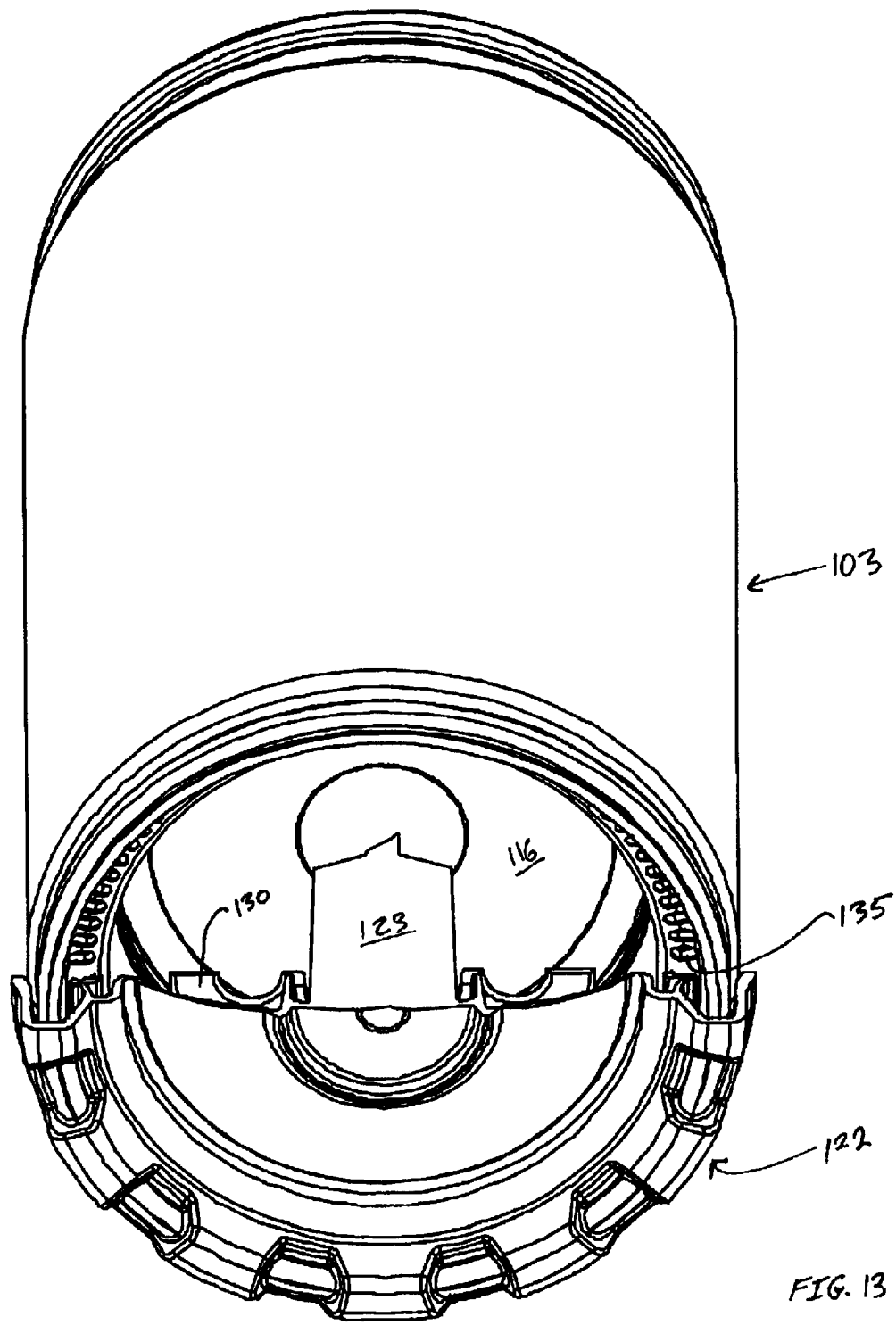
FIG. 13 is a cut-away bottom perspective view of ridges forming a vent on the underside of the water cup.

Another distinction from previous embodiments is the sealing disc 130, which will be positioned between water cup 115 and end cap 122. As shown in FIG. 12B, sealing disk 130 will include a main body section 133, a center aperture 132 and a sealing edge 131. Sealing edge 131 will be largely separated from body section 133 by two cuts 134a, leaving only attachment tabs 134b connecting sealing edge 131 to body section 133. FIG. 13 shows a bottom perspective view with a portion of end cap 122 and sealing disc 130 cut away in order to more clearly illustrate the positioning of ridges 135 in relation to the other components of thermic module 101.

Figure 14:
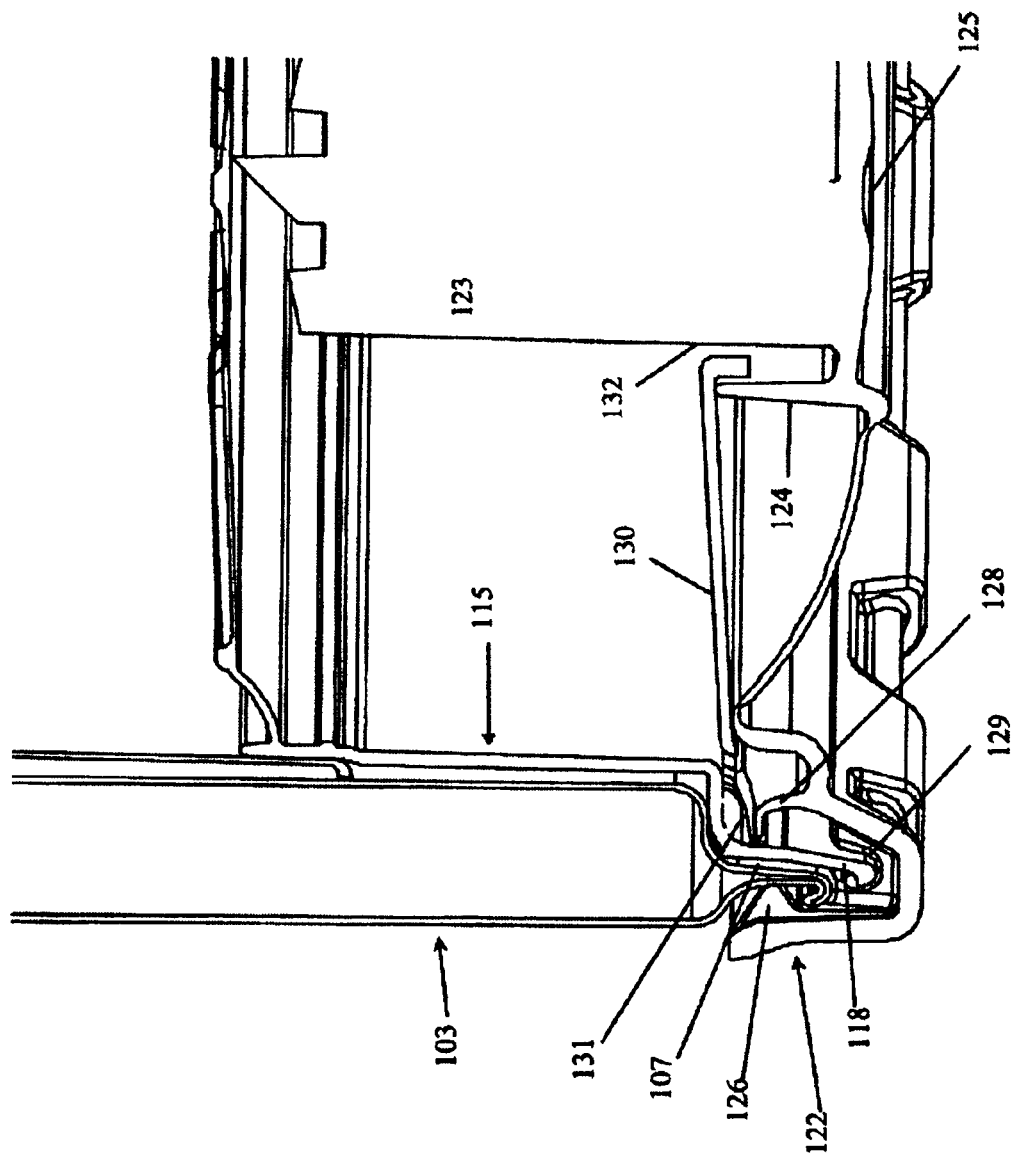
FIG. 14 is a side sectional view showing the sealing disc in place.

FIG. 14 is a sectional view best showing the operation of sealing disc 130 in thermic module 101. As in previous embodiments, end cap 122 will grip the bottom rim of can 103 with attachment pressure grips 126 while gripping lower rim 118 of water cup 115 with water cup snap grips 129. However, sealing disc 130 is now positioned between water cup 115 and end cap 122. It can be seen that actuator 123 extends through center aperture 132 of sealing disc 130 while push ring 124 engages sealing disc 130 around the periphery of center aperture 132. Most notably, the sealing edge 131 of sealing disc 130 extends outwardly and engages the inside surface of lower rim 118 of water cup 115 in order to form a seal between those two surfaces. Simultaneously, vent seal 128 extends upwardly to engage the bottom of sealing edge 131 and forms a seal between those two surfaces. Thus, the water (or gas if any) in water cup 115 may pass between ridges 135 on water cup 115, but may not escape between the inner surface of lower rim 118 and sealing edge 131. Nor can water flow escape between the bottom of sealing disc 130 and vent seal 128.

FIG. 12A also shows a ring seal 114 formed on water cup 115. There may be instances where a particular provider of self-heating beverages does not wish to employ a lime cup 10, but rather wishes to load quicklime directly into the cavity. In such a case, the water cup would be required to maintain the quicklime within the cavity. It is also important that the water cup form a moisture tight seal between the quicklime and the outside environment. Otherwise, moisture in the environment will eventually contaminate the quicklime and lessen it's reactivity. Ring seal 114 is sized to firmly engage the internal sidewalls of the thermic cavity and eliminate the migration of any moisture from below ring seal 114 into the area containing quicklime. In this manner, the dryness and therefore the reactivity of the quicklime is preserved.

Figure 15:
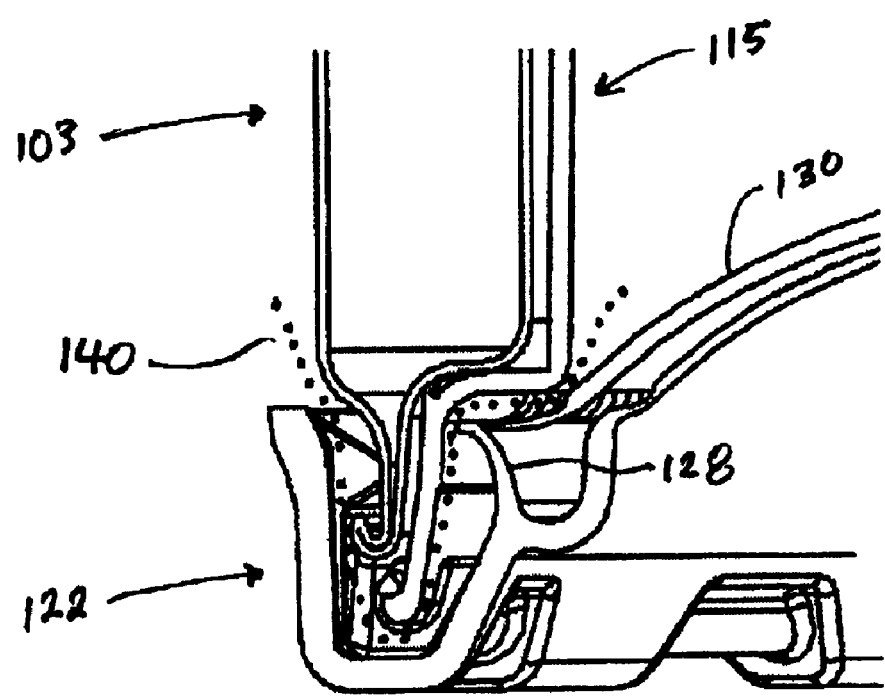
FIG. 15 is a side sectional view showing the sealing disc withdrawn.

The operation of thermic module 101 differs somewhat from previously described embodiments. As the water mixes with the solid reactant, reactant gases and steam (if the temperature exceeds water's boiling point) will be produced. The production of excess steam is often considered undesirable because of its potential for burning a person handling the can. It is also believed that the thermal energy available in the reacting quicklime is not as efficiently transferred to the can contents when excessive amounts of steam are generated due to the loss of a large number of calories per gram of vaporized water due to the phase change. To prevent the production of excess steam, it is necessary to prevent excessively rapid heating of the reactants. One manner of slowing the rate of heating is to prevent pressure from building up in the thermic module during the reaction process. When it is desired to activate thermic module 101, the can will be turned upside down, activator button 125 pressed, and the bottom of end cap 122 will flex toward breakable barrier 116 as in previous embodiments. However, the movement of end cap 122 now carries with it push ring 124. As push ring 124 moves toward breakable barrier 116, it will carry with it sealing disc 130. The movement of sealing disc 130 will eventually pull the sections of sealing edge 131 connected to and adjacent to attachment tabs 134b (see FIG. 12B) out of engagement with water cup lower rim 118 as shown in FIG. 15. With the dislodgement of sealing edge 131 from lower rim 118, a path 140 (dotted line) for gas is created between ridges 135 and down the inside surface of lower rim 118. Gas may travel between the cup snap grips 129 and out of the can through the breaks 127 (see FIG. 12A) in can pressure grips 126. In a preferred embodiment, it is envisioned that path 140 will allow gas to escape the interior of thermic module 101 at virtually atmospheric pressure. Alternately, if close fitting parts along path 140 cause some increase in pressure within thermic module 101, it is preferred that pressure not be allowed to exceed about 2 psi before gas escapes along path 140. Once the sealing disc 130 is extended upward toward breakable barrier 116, it performs a secondary function. Because breakable barrier 116 has been ruptured and also because it is purposefully designed of a thin material, it is sometimes possible in prior art devices for hot quicklime to fall through the broken barrier or even melt the barrier and come into contact with end cap 122. If the quicklime has sufficient heat energy remaining, it could possibly melt through end cap 122 and pose a serious burn hazard. However, when sealing disc 130 is moved forward with end cap 122 in the present invention, sealing disc becomes positioned directly beneath the broken barrier 116. Thus, sealing disc 130 provides one further layer of material which hot quick lime must work its way past or burn through before the quicklime encounters end cap 122. In most instances, this will make the escape of hot quicklime outside the module a far lesser possibility. Typically scaling disc 130 will be constructed of a plastic having sufficient thickness to withstand (i.e. not melt completely through) 200° C. for at least five minutes and 150° C. for at least ten minutes. In one embodiment, sealing disc 130 could be constructed from polypropylene and be between approximately 1 mm and 2 mm in thickness.

Returning to FIG. 14, it will be understood that with sealing disc 130 in place, pressure vent 128 will operate in the same manner describe above in reference to FIG. 5D. Even in embodiments with sealing disc 130 and vent path 140, there may be particular circumstances that make it is desirable to have pressure vent 128. For example, if there is a leak in water cup 115 while the can is stored, which allows water and the solid reactant to mix, pressure cannot escape along vent path 140 because the thermic module has not been activated with button 125. If pressure continued to build as the heating components reacted, it is possible the can could rupture or at the very least, the end cap 122 would be exploded off the bottom of the can with the reactants being spread to the surrounding area. However, pressure vent 128 will activate prior to these occurrences and allow pressure to escape outside the can and maintain the can in an assembled condition.

Figure 16:
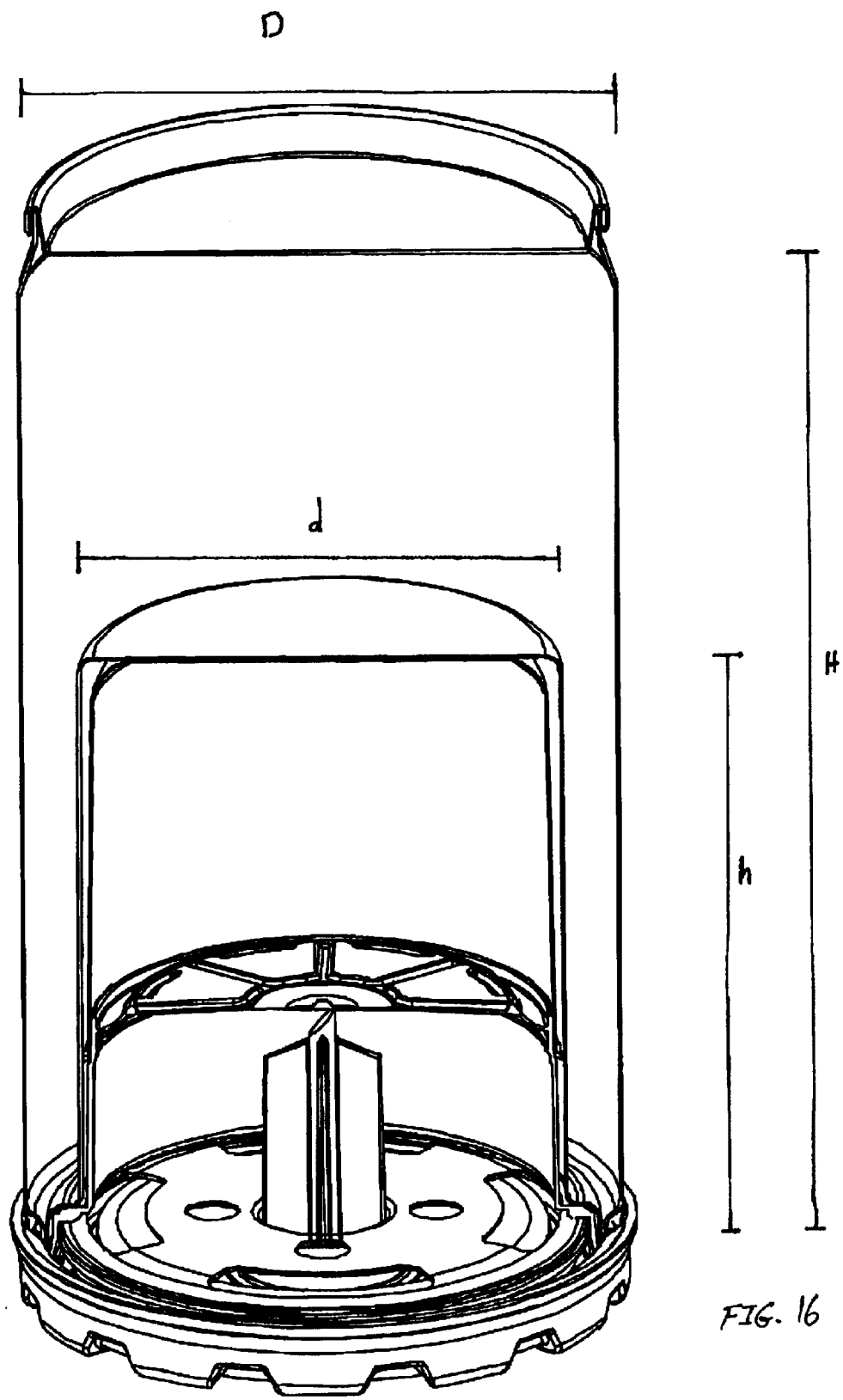
FIG. 16 is a side sectional view of an alternate thermic cavity and module.

As discussed above, in some circumstances it may be acceptable to have a self-heating can which may heat 210 ml of liquid approximately 40° C., but it is more advantageous to increase the liquid temperature by approximately 50 to 60° C. However, this is not a characteristic that the prior art has been capable of incorporating in a standard soda can sized container. Typically such a container may be no more than 127 mm in height to accommodate convention vending machines and no more than 68.2 mm in diameter to accommodate conventional canning lines. Prior art soda type cans generally have an overall volume of approximately 325 to 350 ml (and 210 ml of beverage volume in prior art self heating soda type cans). It has been discovered that to minimize the amount of steam generated and to achieve a temperature change of approximately 50° C., it is desirable to increase the volume of the reactants used while also moderating the intensity of the reaction. The conventional soda size self heating cans have thermic modules which can accommodate approximately 75 ml (or 66 grams) of solid reactant and approximately 28 ml of liquid reactant. However, prior art devices typically cannot heat 210 ml of beverage much more than 40° C. particularly without creating significant amounts of steam. It has been discovered that a soda size can accommodating larger reactant volumes will assist in providing a can which will heat 210 ml of liquid at least 50° C. with a minimum of steaming. FIG. 16 illustrates a can meeting these criteria. Can 103 will have a diameter D of 67 mm and a height H of 116 mm to provide a maximum usable volume of approximately 384 ml. The thermic cavity will have a height H of approximately 66 mm and a diameter D of approximately 62 mm, although it may be desirable to have the walls of the cavity taper slightly upwards (e.g. a D of 62 mm at the bottom of the cavity and 61.4 mm at its top).

This larger volume cavity allows the employment of larger volumes of reactants which assists in achieving the desired results of heating the contents of the can at least 50° C. while minimizing the amount of steam generated. Also, the use of a more reactive lime will aid in obtaining higher temperatures. The reactivity of quicklime may be measured by a standard slaking rate test such as defined in ASTM C-110. Generally, this standard involves mixing approximately 150 g of quicklime in 600 ml of water and observing the temperature change. This standard further provides the term "Total Temperature Rise" which is defined as the difference between the initial temperature and the temperature at the time when three consecutive temperature readings do not change more than 0.5° C. In one preferred embodiment, the quicklime employed as the solid reactant will have a Total Temperature Rise of at least 60° C. One example of such quicklime is available from Natsteel Chemicals (M) Sdn Bhd, Lot 38046, Mukim Sg Raia, Batu 5, Jalan Gopeng, 31300 Kg Kepayang Perak, Malaysia and has a composition of Active CaO—86%–90%; Total Calcium Oxide (as CaO)—88%–92%; Carbon Dioxide (as $CO_2$)—2% max; Magnesium Oxide (as MgO)—2.5% max; Silica (as $SiO_3$)—0.3% max; and Iron Oxide & Aluminum Oxide (as $Fe_2O_3$ and $Al_2O_3$)—1% max. The reactivity is stated as:

| | |
|---|---|
| $T_{sec}$ ° C. | 6–12 minutes |
| $T_{max}$ ° C. | 66° C. min |
| | 70° C. max |

(where $T_{sec}$ is the time to reach the maximum temperature and $T_{max}$ is maximum temperature, i.e. Total Temperature Rise reached during testing)

However, Total Temperature Rise values of about 50° C. degrees and even about 45° C. are considered within the scope of the present invention. It is believed that the main factor controlling the Total Temperature Rise is the percent of active CaO in the quicklime. "Active CaO" means the total Ca available for reaction with water (as CaO) as opposed to Ca existing in other forms such as $CaO_3$. The prior art CaO based solid reactants typically only have active CaO percentages of approximately 68%. It is believed that significantly improved results are obtained when using a percent of active CaO of over 70%, more preferably over approximately 75% and still more preferably approximately 85%–90% or higher. Those skilled in the art will recognize that the percentage of active CaO will be influenced by the amount of atmospheric moisture to which the quicklime is exposed. Thus procedures for minimizing the exposure of quicklime to atmospheric moisture prior to mixing the quicklime with a liquid reactant are generally preferred. Additionally, certain impurities in the quicklime tend to reduce it's heat generating capacity. For example, significant percentages insoluable silicas such as $SiO_2$ will have an adverse affect on the quicklime's performance. Prior art quicklimes known to the inventor typically have a insoluable silica content of over 3%. The present invention employs a quicklime having a insloluable silica content of less than approximately 3% and preferably less than 1% as the above Natsteel quicklime which has a maximum $SiO_2$ content of 0.3%.

Additionally, the use of a reaction inhibitor or moderator will significantly reduce the tendency for steam to be generated. While the prior art has employed materials containing potassium hydroxide in the liquid reactant as a moderator, this compound has significant drawbacks. Potassium hydroxide is generally considered a toxic substance if ingested and an irritant if contacted with the skin or is inhaled. Thus, the escape of potassium hydroxide either through steam or from unintended leakage of the thermic module may pose a health hazard, particularly to small children. However, the present invention employs a moderator in the solid reactant which has the very significant advantage of being non-toxic, non-irritating and producing no objectionable odor. In one preferred embodiment, this moderator is a carbonate compound from the group of $MgCO_3$, $CaCO_3$, $SrCO_3$, $BaCO_3$, or $RaCO_3$. More preferably, the moderator is a mixture of approximately 18% $MgCO_3$ with the remainder being $CaCO_3$, more commonly known as "Dolomite". However, other variations of the $MgCO_{3/CaCO3}$ combination could also be considered Dolomite as long as there is at least 2.5% $MgCO_3$. In the present invention, one preferred Dolomite employed will be uncalcined (i.e. has not been heated in a kiln), will have a Moh's hardness of between 3 and 5 and a specific gravity of 1.7.

In a preferred embodiment, the solid reactant will comprise approximately 12.5% Dolomite and 87.5% of a quicklime compound such as described above (referred to herein as a 12.5% Dolomite/quicklime mixture). However, other percentages of Dolomite may sufficiently moderate the quicklime reaction, such as anywhere from an about 5% to about 25% Dolomite/quicklime mixture. One preferred ratio of the solid to liquid reactants is 80 gm of the 12.5% Dolomite/quicklime mixture and 32.5 gm of water. This ratio of reactants has been found to reliably heat 210 ml of beverage in a can such as seen in FIG. 16 at least 50° C. within approximately 3 minutes. However, a solid reactant amount of at least about 75 gm of 12.5% Dolomite/quicklime mixture and 30.5 gm water is sufficient to achieve 50° C. change in temperature and about 72 gm of the 12.5% Dolomite/quicklime mixture and 29.2 gm water is sufficient to achieve about a 50° C. change in temperature. Using at least about 70 gm of the 12.5% Dolomite/quicklime mixture and 28.4 gm water has been found to achieve a temperature change of about 45° C. Further quicklime/moderator mixtures could include any combination having at least 70% by weight CaO and at least 5% by weight of a carbonate from the group consisting of $MgCO_3$, $CaCO_3$, $SrCO_3$, $BaCO_3$, and $RaCO_3$. Moreover, additional ratios of solid to liquid reactants could include about 65–85 grams solid reactant to about 27–33 grams liquid reactant or about 60–90 grams solid reactant to about 20–40 grams liquid reactant. All of these ratios should be considered within the scope of the present invention.

The mixture of quicklime (CaO) and Dolomite ($MgCO_3$+$CaCO_3$) with water ($H_2O$) is believed to result in the following series of reactions:

$$CaO + H_2O \rightarrow Ca(OH)_2 \, Ca(OH)_2 + CO_2 \rightarrow CaCO_3 + \text{Heat} \quad \text{A)}$$

Heat from the conversion of CaO to $Ca(OH)_2$ and ultimately to $CaCO_3$ is an exothermic reaction producing heat. However, the heating of $MgCO_3$ results in an endothermic reaction such as:

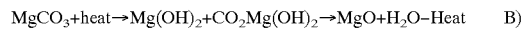

$$MgCO_3 + \text{heat} \rightarrow Mg(OH)_2 + CO_2 \, Mg(OH)_2 \rightarrow MgO + H_2O - \text{Heat} \quad \text{B)}$$

Similarly, the $CaCO_3$ transformed by heat into CaO by the reaction:

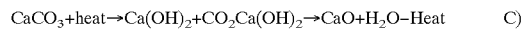

$$CaCO_3 + \text{heat} \rightarrow Ca(OH)_2 + CO_2 \, Ca(OH)_2 \rightarrow CaO + H_2O - \text{Heat} \quad \text{C)}$$

Thereafter, the newly formed MgO (and CaO as in reaction A) is then recombined with water to give off more heat:

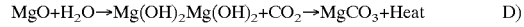

$$MgO + H_2O \rightarrow Mg(OH)_2 \, Mg(OH)_2 + CO_2 \rightarrow MgCO_3 + \text{Heat} \quad \text{D)}$$

In these series of reactions, the overall rate of reaction is slowed and a portion of the heat energy temporarily stored in the newly produced MgO and CaO before these compounds themselves react and give off heat. Additionally, the creation of water as a byproduct in several of the above reactions provides additional liquid reactant which need not take up volume in the water cup.

There are several factors which contribute to the immediately above described embodiment providing superior results and safety to the prior art and even to some degree, superior to the earlier described embodiments. The contents of a hot beverage for adults should be heated to at least above 60° C., but typically not as high as 80° C. (which would be considered scalding hot). Therefore, if the beverage is initially at room temperature (approximately 20° C. to 23° C.), then an increase of 50° C. will leave the beverage at a reasonably hot 70° C. to 73° C. Moreover, this may be accomplished with a minimum of steaming and virtually eliminates the risk of escaping steam scalding the user. Naturally, other factors may affect the degree of steaming. Most notably if the starting temperature of the liquid is significantly above room temperature prior to activating the thermic module, the chance of the liquid reactant in the module boiling are significantly increased and there is a much greater likelihood that a noticeable quantity of steam will be generated. The problem of prior art devices producing too much steam is particularly acute when the starting temperature of the beverage liquid is above 10–15° C. However, the use of solid reactant moderator compounds such as discussed above greatly alleviates the steaming problem. For example, the current invention has been tested with beverage starting temperatures as high as 36° C. without any noticeable steaming being observed. It has also generally been noted that a greater temperature change has been achieved when starting at lower temperatures. For example, there is a 5° C. greater maximum temperature increase achieved by canned beverages starting at 9° C. as compared to those starting at 36° C.

Figure 20:
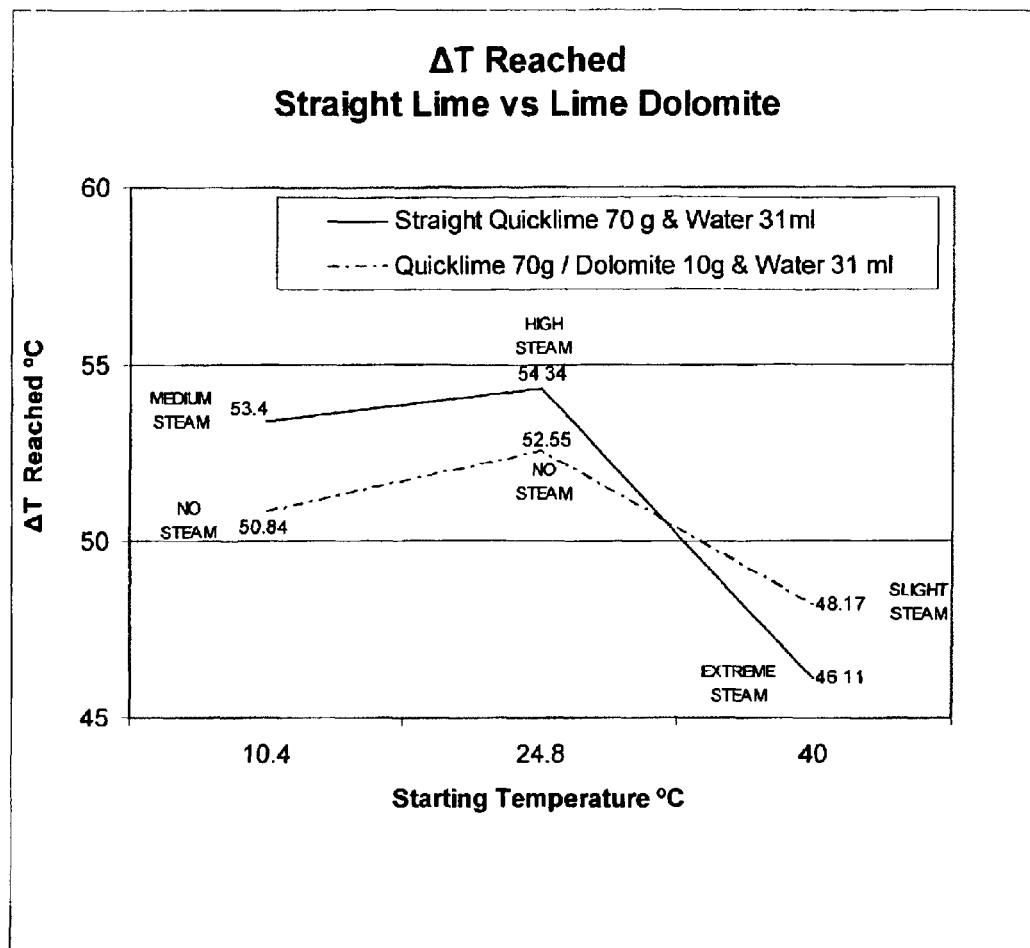
FIG. 20 is a chart illustrating the lack of steam by certain embodiments of the present invention.

FIG. 20 illustrates the results of one experiment comparing self-heating cans with thermic modules having a solid reactant of 70 gm exclusively quicklime as opposed to thermic modules having 10 gm of Dolomite mixed with 70 gm of quicklime. The vertical axis of the graph is the change in temperature of the liquid within the can while the horizontal axis is the starting temperature of the beverage. It can be seen how cans with thermic modules having the quicklime/Dolomite mixture generally produced no steam (with only slight steam at the highest beverage starting temperature and which is easily contained by the label) while the exclusively quicklime modules always produced steam judged to be between medium steam and extreme steam which cannot be contained by the label and could seriously burn a person handling the can.

The present invention also includes a novel method of forming a can having a cavity for a thermic module. FIG. 17 illustrates several steps in a process for forming a deep drawn, side seamless can having a cavity for a thermic module. It will be understood that there are intermediate steps between those steps shown, but those of skill in the art will readily comprehend those intermediate steps given the basic steps shown. It is known in the art to take a metal blank or starter piece such as a sheet of aluminum and subject the blank to a deep draw process (see U.S. Pat. No. 5,072,605 which is incorporated by reference herein). Typically, the metal sheet is subject to a shaping by a drawing die and a punch through a series of seven stages in which the die and punch gradually take the shape of the final can. The earlier stages will form a metal blank into a short, large diameter pre-can cup 150 as suggested in FIG. 17A. Further stages will then lengthen the sides of cup 150 and narrow its diameter to obtain the ultimate can body shape 151 as suggested in FIG. 17B. The can body will have a lid flange 153 which will provide the material necessary to crimp a can lid thereto. While the steps suggested in FIGS. 17A and 17B are known in the art, FIGS. 17C and 17D provide additional novel drawing steps to produce the cavity containing can of the present invention. While the inventive process includes a step similar to FIG. 17B, the can will be drawn to a height greater than the final desired height of the can. This provides the necessary space and material to invert part of the can to form the thermic module cavity. In a series of punch steps, the bottom of the can will be inverted and pushed into the portion of the can which remains uninverted. FIG. 17C illustrates how this forms pre-cavity indention 152. In subsequent steps, pre-cavity indention 152 is lengthened and widened into the final thermic module cavity 106 seen in FIG. 17D. In the final stages of this process, a bottom can rim 155 is crimped into the bottom edge of the can to provide a rim onto which end cap 122 may be snap-fitted as disclosed above. Normally, thermic module cavity will have a volume of at least 100 ml and more preferably about 150 ml. As opposed to the prior art three step process for manufacturing a can with a thermic cavity, it can be seen that the present invention provides a more efficient 2 step process: 1) drawing the can into a single piece can body, including the thermic module cavity and forming of the ridge for griping by the thermic module; and 2) crimping the lid onto the can body.

Figure 18:
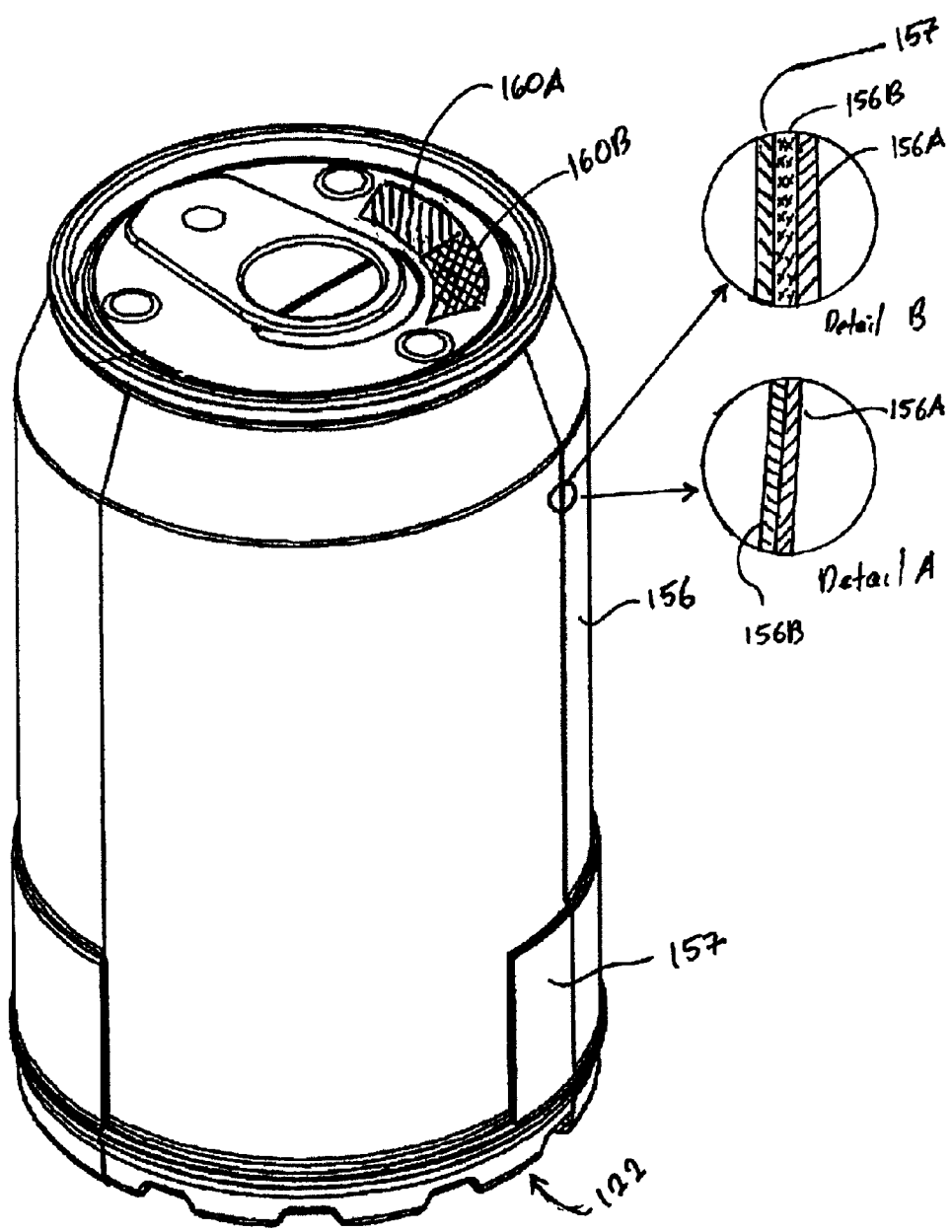
FIG. 18 shows an alternate embodiment of the can's shrink wrap label.

Another aspect of the present invention is insulated label 156 which will surround the self heating can as seen in FIG. 18. As suggested in Detail A, the insulation aspect of label 156 will comprise a polyethylene foam sheet 156B approximately 0.5 mm in thickness such as is available from TOSIN PACKAGING of Selangor, Malaysia. This foam sheet 156B will be adhered to a polyvinyl-chloride shrink film 156A which is approximately 50 um in thickness and has a shrinkage of approximately 58%. Such film is available from manufacturers such as KOMAK General Labels of Balakong, Malaysia. Preferably, the foam insulation is laminated to the PVC film prior to the film being applied to a container. Generally, the PVC film 156A is reverse side printed with a solvent based ink. The foam sheeting is then laminated to the PVC film using a water soluble adhesive which will not adversely affect the ink on the PVC film. If multiple labels are formed on a single sheet of the foam insulation/PVC film label, then the individual labels are cut from the sheet and rolled into a tube shape. A thin (e.g. 0.5 cm) strip of clear PVC shrink film having a solvent based adhesive applied thereto may be used to glue together the overlapping edges of the tube. Typically, the label tube will be a few centimeters longer than the can to which the label is applied. Thus, when the label is heat shrunk onto the can, this extra length of shrink wrap PVC material will form around end cap 122 and assist in keeping end cap 122 firmly in place. Naturally, the center area of end cap 122 is left clear of the shrink wrap material in order that the activation button may be depressed by a user.

In a preferred embodiment, a thin strip of absorbent material 157 will be placed around the can base and between the can and shrink label 156. In this embodiment, absorbent material 157 is 140 grammage blotting paper such as sold under the brand name Fordgold by ARJO WIGGINS FINE PAPERS LTD Fine Paper House Lime Tree Way, Chineham Basingstoke RG24 8BA, United Kingdom. In FIG. 18, the blotting paper has been folded several times to form the approximately one inch high strip which encircles the base of the can. Absorbent material 157 will prevent any moisture which happens to escape end cap 122 from escaping outside of label 156. This will keep moisture from damaging the printing on label 156 and will prevent any unaesthetic appearance of moisture which a consumer might incorrectly believe is leakage due to a defect in the can.

In an alternate embodiment suggested in Detail B, the absorbent material 157 is adhered to the back of foam insulation layer 156B as part of the overall label and therefore covers the entire surface of the can. In this embodiment, absorbent material 157 could be the blotting paper described above or alternatively a 0.5 mm cotton-wool material. Naturally, any number of absorbent materials could be used in the present invention. However, relatively rigid blotting paper such as mentioned above has the disadvantage not being sufficiently pliable to readily deform as the label shrinks. This tends to interfere with the smooth, tight application of the shrink label to the can. A more preferred embodiment for an absorbent material 157 which is formed as part of a three layer label is conventional paper towel material, such as sold by Nibong Tebal Paper Mill, Sdn. Bhd. of Nibong Tebal, Penang, Malaysia under the tradename "Cutie Compact Household Towel." In a preferred embodiment, absorbent material layer 157 will comprise two layers of 40 grammage (or one layer of 80 grammage) paper towel material which are laminated to the insulation layer 156B as suggested in Detail B of FIG. 18. The grammage of a paper is generally defined as grams per square meter of material. Additionally, the paper towel material disclosed will typically absorb an amount of liquid equal to approximately six times the paper's dry weight. If two 20 cm×25 cm sections of 40 grammage paper form absorbent layer 157, this layer will be capable of absorbing approximately 24 grams of water. While absorbent material layer 157 could be co-extensive with the entire area of shrink wrap layer 156, a preferred embodiment will have absorbent material layer 157 stop approximately 20 mm from the bottom end (i.e. the end wrapping around the thermic module end cap) of label 156. Because of the pliability of the paper towel material, it readily accommodates the shrinkage of shrink wrap label 156. Moreover, when the paper towel material's dimensions are reduced by the shrinkage of label 156, this tends to produce wrinkles or small channels (about 0.2–0.9 mm wide and about 0.5–1.0 mm deep) in the paper towel material. These channels tend to allow any moisture escaping the thermic module to travel up the length of absorbent layer 157 and be more efficiently absorbed.

Figure 19:
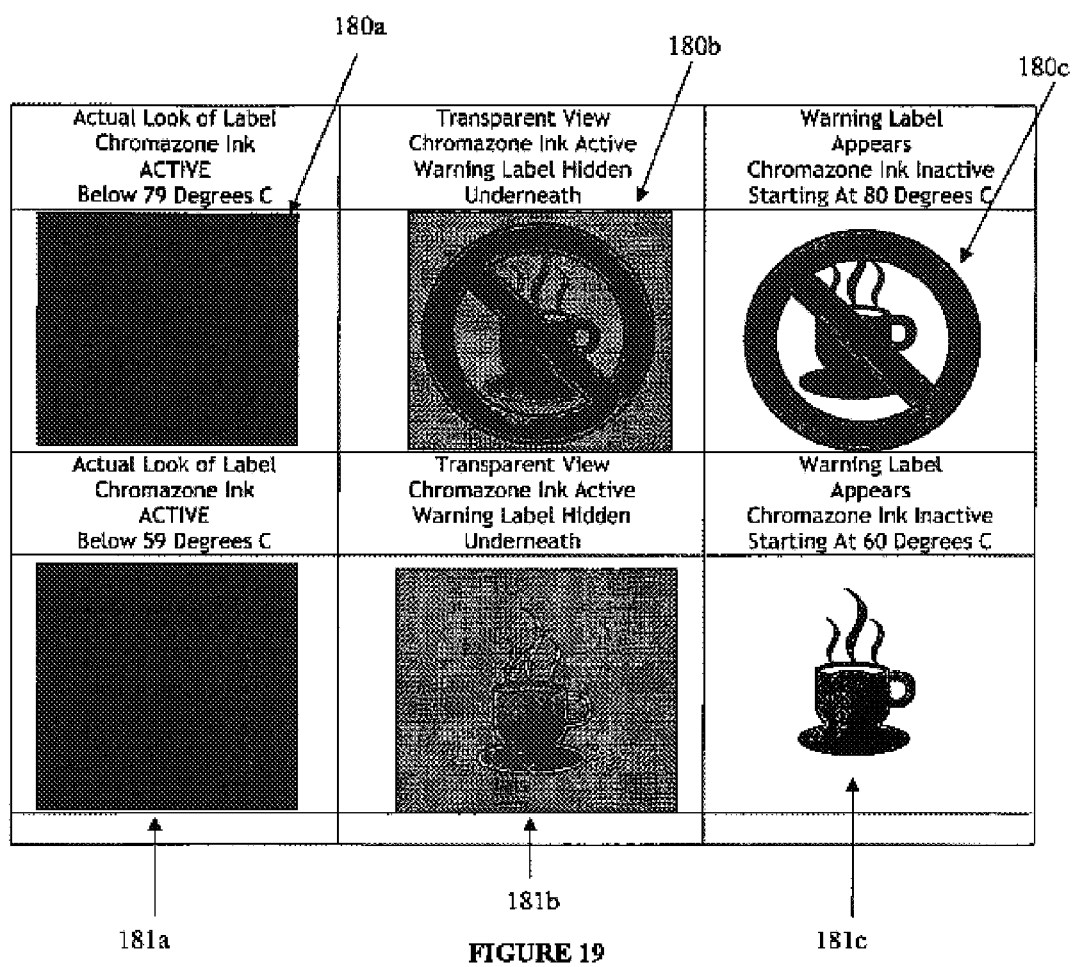
FIG. 19 shows an alternative embodiment of a thermographic ink indicator.

In a preferred embodiment, some printing may be written with thermographic ink and may be applied to certain areas of the can such as the can lid. Thermographic ink changes colors upon reaching a predetermined temperature. In this manner, certain areas of the can could change color when the contents of the can have reached a temperature which is considered to be sufficiently hot. As an example, FIG. 18 shows two sections of thermographic ink 160A and 160B. The thermographic ink could be formulated such that both sections 160A and 160B are the same color (e.g. blue or clear with some marking or color below it) when the can is below a suitable temperature for drinking. As the can approaches the correct temperature range for drinking, section 160B could become a second color (e.g. green) indicating the can contents are at the proper temperature for consumption. If the contents of the can became too hot, section 160A could become a different color (e.g. red), thereby cautioning the consumer about the overly hot beverage. Naturally, the thermographic ink could take on any design and could be formulated to change color over any given range of temperatures. For example, for infant baby formula the ink might change color at approximately 40° C. to indicate the beverage is ready to drink as opposed to the approximately 65° C. for an adult beverage. More preferably, when dealing with drinks for infants, the first color indication could take place at approximately 37° C. to indicate a suitable drinking temperature and a second color indication could take place at approximately 43° C. to indicate the drink was too hot for infants to drink. For adults, the first color indication could take place at approximately 60° C. to indicate a suitable drinking temperature and a second color indication could take place at approximately 80° C. to indicate the drink was too hot to drink. Naturally, variations of these temperature ranges is within the scope of the present invention. Additionally, the present invention encompasses the first and second indicators not only being true "colors" such as red and green, but also the indicators being different shades of a single color including different shades of gray and even the ink changing from opaque to transparent or some particular color. The term "color" as used herein is intended to encompass all these alternatives. For example, the in one embodiment suggested in FIG. 19, the first thermographic ink indicator 180a will be opaque below a certain temperature (e.g. 80° C.). Section 180b conceptually illustrates a symbol which is hidden or masked from view by the thermographic ink. Upon reaching that temperature, the thermographic ink will become transparent and reveal or unmask a "too hot to drink" warning symbol 180c positioned under the ink. Likewise, the second indicator 181a would have a "ready to drink" symbol 181c positioned under thermographic ink which became transparent at a suitably hot drinking temperature (e.g. 60° C.).

Furthermore, this concept of employing thermographic ink could be applied to food or drink containers which are not necessarily self-heating. For example, the above described thermographic ink printing could be used on disposable coffee cups or microwavable food products. Likewise, the thermographic ink could not only be used directly on the container, but also be applied to an adhesive label or "sticker" which would then be applied to the container lid. Thermographic inks for carrying out this embodiment are well known and available under the tradename "Chromazone" and manufactured by Thermographic Measurements Co. Ltd, in the United Kingdom and supplied by Eckart America located in Painesville, Ohio.

While the foregoing description illustrates several alternate embodiments, the present invention is not limited to these particular configurations. For example, while the embodiments shown in all Figures (except FIG. 8), illustrate the elements of the thermic module formed of plastic, the scope of the present invention encompasses thermic module elements form of different materials. For example, the upper cup could be formed of aluminum have a thickness of 0.05 to 0.1 mm. While aluminum exhibits some of the disadvantages associated with the prior art, the use of the above disclosed quicklime to water ratios and positive pressure modules can make aluminum inserts a viable alternative. Additionally, the present invention could obviously include a method of using the novel thermic module. For example, a method of assembling a self-heating container could include the following steps. First, a manufacturer would provide a container which includes an enclosed space for a food or beverage, a sealable top end on the enclosed space, and a bottom end with a thermic module cavity. The thermic module cavity would have internal walls extending toward the top end of the container. Second, the manufacturer would fill the enclosed space with a food or beverage and seal the top end. Third, the manufacturer would sterilize the sealed container and/or the contents therein. Finally, the manufacture would secure the thermic module in the cavity after the sterilization of the container. The term "sterilization" is intended to include within its definition, not just the complete elimination of all micro-organisms, but also lesser degrees of treatment common in the food industry such as, ultra high temperature (UHT) treatment, pasteurization, radiation treatment, or any other process for reducing micro-organisms or increasing the shelf-life of a product. In addition to the four steps described above for assembling a self heating container, a fifth step relating to the label could be included. The prior art must accomplish the label application in two steps: first wrap the cardboard insulation material around the can; and second apply the heat shrink label. However, using the above described two layer label having foam insulation applied to the shrink wrap film (or the three layer label comprising the absorbent paper/foam insulation/shrink wrap film combination), the cardboard positioning step of the prior art is eliminated. The inventive labeling step would simply comprise application of the two layer or three layer label to the container. This improved labeling process would significantly improve the overall rate of finished can production. Further, while the embodiments above were usually described in terms of standard soda sized containers (i.e. approximately 350 ml overall volume and approximately 210 ml beverage volume), other container sizes are generally within the scope of the present invention. For example, "tall boy" type cans which have roughly the same diameter as soda cans but have significantly more height usually have an overall volume of approximately 475 ml. If incorporating a thermic module, these containers will typically have a beverage volume of at least approximately 305 ml. Moreover, where ever the specification and claims mention "beverage", it should be understood that this term includes any type of food which might be incorporated into a self-heating can. These and all other obvious variations of the described embodiments are intended to come within the scope of the following claims.

I claim:

1. A self-heating container comprising:
   a. a container body with a thermic heating module cavity;
   b. a thermic heating module engaging said cavity;
   c. a vent combined with said thermic heating module, said vent resisting an internal pressure of more than 2 psi prior to activation of said thermic heating module and resisting internal pressure of no more than 2 psi after activation of said thermic heating module.

2. The self-heating container according to claim 1, wherein
   a. said thermic heating module includes a dividing wall separating first and second chemical reactants and an end cap having an actuator for puncturing said dividing wall; and
   b. said is vent positioned between said end cap and said dividing wall and has a vent seal positioned to block said vent, said vent seal comprising a sealing disc constructed to move out of engagement with said vent upon activation of said module.

3. The self-heating container according to 2, wherein said thermic module includes a water cup positioned therein and said vent is formed by a series of ridges formed on a bottom perimeter surface of said water cup.

4. The self-heating container according to claim 3, wherein said sealing disc is positioned between said series of ridges and said end cap, said sealing disc further including a center aperture through which said actuator extends.

5. The self-heating container according to claim 1, wherein after activation of said module, said vent releases internal pressure at substantially atmospheric pressure.

6. A thermic module for a self-heating container, wherein said container includes a bottom end with a cavity having internal walls formed therein for receiving said thermic module, said thermic module further comprising:
   a. a first cup having plastic walls and containing a first chemical reactant;
   b. a second cup containing a second chemical reactant;
   c. a dividing wall positioned between said first and second cups such that said first and second chemical reactants cannot mix;
   d. an end cap positioned below said second cup and retaining said second chemical reactant within said second cup;
   e. an actuator fur puncturing said dividing wall positioned between said end cap and said dividing wall;
   f. a first vent positioned between said end cap and said dividing wall; and
   g. a vent seal operatively connected to said actuator and positioned to block said first vent, said vent seal being constructed such that depressing said actuator moves said vent seal to unblock said first vent.

7. The thermic module of claim 6, wherein said first vent comprises a series of ridges formed on a bottom perimeter surface of said second cup.

8. The thermic module of claim 7, wherein said vent seal is a sealing disc positioned between said series of ridges and said end cap, said sealing disc further including a center aperture through which said actuator extends.

9. The thermic module of claim 8, wherein said sealing disc is constructed of a material and thickness which withstands temperatures of up to approximately 150° C. for at least ten minutes.

10. The thermic module of claim 8, wherein upward movement of said actuator moves said sealing disk out of engagement with said series of ridges.

11. The thermic module of claim 6, further comprising a second, pressure activated vent, wherein the pressure from mixing reactants must exceed at least about 2 psi before said second vent is activated.

12. The thermic module according to claim 6, wherein said thermic module comprises
    a solid reactant, said solid reactant including at least 70% by weight CaO and at least 5% by weight of a carbonate from the group consisting of $MgCO_3$, $CaCO_3$, $SrCO_3$, $BaCO_3$, and $RaCO_3$.

13. The thermic module according to claim 12, wherein said carbonate is between approximately 5% and 25% by weight of said solid reactant.

14. The thermic module according to claim 13, wherein said carbonate is approximately 12.5% by weight of said solid reactant.

15. The thermic module according to claim 6, further comprising:
    a. a container body incorporating said thermic module;
    a label fitted onto said container, said label comprising a first layer formed of a shrink-wrap material and a second insulating layer of a polymer foam material adhered to said layer of shrink-wrap material.

16. The thermic module according to claim 15, wherein a strip of absorbent material is positioned around the bottom portion of said container prior to the application of said label.

17. The thermic module according to claim 15, wherein a third layer of absorbent material is adhered to said second layer of insulating material.

18. The thermic module according to claim 17, wherein said absorbent material is a pliable highly absorbent paper.

19. The thermic module according to claim 15, wherein said thermic module is a heating module.

20. The thermic module according to claim 15, wherein said polymer foam material is adhered to said shrink wrap material prior to said label being applied to said container body.

21. A self-heating container, wherein said container includes a bottom end with a cavity having an internal wall formed therein for receiving said thermic module, said container further comprising:
    a. a first chemical reactant position within said cavity;
    b. a cup positioned below said first chemical reactant, said cup containing a second chemical reactant and having a sealing ring formed around an outside diameter of said cup in order to engage said internal wall of said cavity and form a moisture tight seal;
    c. an end cap positioned below said cup and retaining said second chemical reactant within said cup;
    d. an actuator for puncturing a top portion of said cup;
    e. a vent positioned between said end cap and said top portion of said cup; and
    f. a vent seal operatively connected to said actuator and positioned to block said vent, said vent seal being constructed such that depressing said actuator moves said vent seal to unblock said vent.

22. A thermic module for a self-heating container, wherein said container includes a bottom end with a cavity having internal walls formed therein for receiving said thermic module, said thermic module further comprising:
   a. a first cup having plastic walls and containing a first chemical reactant;
   b. a second cup containing a second chemical reactant;
   c. a dividing wall positioned between said first and second cups such that said first and second chemical reactants cannot mix;
   d. an end cap positioned below said second cup and retaining said second chemical reactant within said second cup;
   e. an actuator for puncturing said dividing wall positioned between said end cap and said dividing wall;
   f. a first vent positioned between said end cap and said dividing wall and comprising a series of ridges formed on a bottom perimeter surface of said second cup; and
   g. a vent seal positioned to block said first vent, said vent seal comprising a sealing disc positioned between said series of ridges and said end cap, said sealing disc further including a center aperture through which said actuator extends, thereby unblocking said first vent upon activation of said module.

* * * * *